(12) United States Patent
Giobbi

(10) Patent No.: US 9,892,250 B2
(45) Date of Patent: *Feb. 13, 2018

(54) SECURE ELEMENT AS A DIGITAL POCKET

(71) Applicant: Proxense, LLC, Bend, OR (US)

(72) Inventor: John Joseph Giobbi, Bend, OR (US)

(73) Assignee: Proxense, LLC, Bend, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/195,889

(22) Filed: Jun. 28, 2016

(65) Prior Publication Data

US 2016/0306956 A1 Oct. 20, 2016

Related U.S. Application Data

(63) Continuation of application No. 14/274,711, filed on May 10, 2014, now Pat. No. 9,405,898.

(60) Provisional application No. 61/822,057, filed on May 10, 2013, provisional application No. 61/864,237, filed on Aug. 9, 2013.

(51) Int. Cl.
| | |
|---|---|
| *H04L 29/06* | (2006.01) |
| *G06F 21/35* | (2013.01) |
| *G06F 21/44* | (2013.01) |
| *G06F 21/34* | (2013.01) |
| *H04W 12/08* | (2009.01) |
| *H04W 12/06* | (2009.01) |

(52) U.S. Cl.
CPC ............. *G06F 21/35* (2013.01); *G06F 21/34* (2013.01); *G06F 21/44* (2013.01); *H04L 63/0861* (2013.01); *H04W 12/06* (2013.01); *H04W 12/08* (2013.01)

(58) Field of Classification Search
CPC .. H04W 12/06; H04W 12/08; H04L 63/0853; H04L 63/0861; H04L 63/10; H04L 63/101; G06F 21/31; G06K 9/00275; G06K 9/00281; G06K 9/00302; G06K 9/00382
USPC .... 713/168, 182, 185, 186, 193; 726/2–5, 9; 380/270
See application file for complete search history.

(56) References Cited

U.S. PATENT DOCUMENTS

| | | |
|---|---|---|
| 5,623,552 A | 4/1997 | Lane |
| 6,728,397 B2 | 4/2004 | McNeal |
| 6,879,966 B1 | 4/2005 | Lapsley et al. |
| 7,231,068 B2 | 6/2007 | Tibor |
| 7,272,723 B1 | 9/2007 | Abbott et al. |
| 7,349,557 B2 | 3/2008 | Tibor |
| 7,512,806 B2 | 3/2009 | Lemke |

(Continued)

*Primary Examiner* — Hosuk Song
(74) *Attorney, Agent, or Firm* — Patent Law Works LLP

(57) ABSTRACT

The disclosure includes a system and method in which one or more virtual resources are presented to a secure element; and the one or more virtual resources are mapped to available resources based on a model architecture for the secure element in order to provide hardware abstraction, the available physical resources varying based on the model architecture and an associated host device, the virtual resources allowing consistent interaction with the virtual resources regardless of variation in the physical resources available and their location. The hardware abstraction increases the versatility of the secure element and may contribute to the secure element's functionality. The secure element providing functionality to replace most items carried in an individual's pockets, e.g., logical and physical keys, a thumb drive, identification, credit and debit cards, etc.

20 Claims, 16 Drawing Sheets

(56) References Cited

U.S. PATENT DOCUMENTS

| | | | |
|---|---|---|---|
| 7,565,329 B2 | 7/2009 | Lapsley et al. | |
| 7,724,717 B2 * | 5/2010 | Porras | G06K 7/0008 |
| | | | 370/332 |
| 7,774,613 B2 * | 8/2010 | Lemke | G06F 21/32 |
| | | | 713/182 |
| 8,296,573 B2 | 10/2012 | Bolle et al. | |
| 8,307,414 B2 * | 11/2012 | Zerfos | H04L 63/0823 |
| | | | 713/158 |
| 8,424,079 B2 * | 4/2013 | Adams | G06F 21/32 |
| | | | 713/168 |
| 8,494,576 B1 | 7/2013 | Bye et al. | |
| 8,522,019 B2 * | 8/2013 | Michaelis | G07C 9/00039 |
| | | | 370/310 |
| 8,577,091 B2 | 11/2013 | Ivanov et al. | |
| 8,678,273 B2 | 3/2014 | McNeal | |
| 8,738,925 B1 | 5/2014 | Park et al. | |
| 9,405,898 B2 * | 8/2016 | Giobbi | G06F 21/44 |
| 2006/0069814 A1 | 3/2006 | Abraham et al. | |
| 2008/0209571 A1 | 8/2008 | Bhaskar et al. | |
| 2011/0246790 A1 | 10/2011 | Koh et al. | |
| 2013/0019323 A1 | 1/2013 | Arvidsson et al. | |

\* cited by examiner

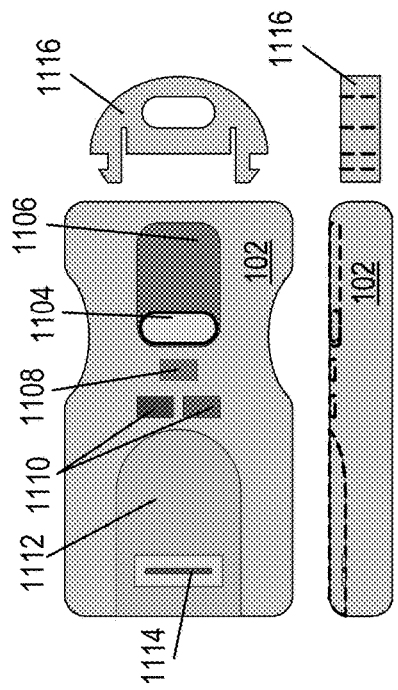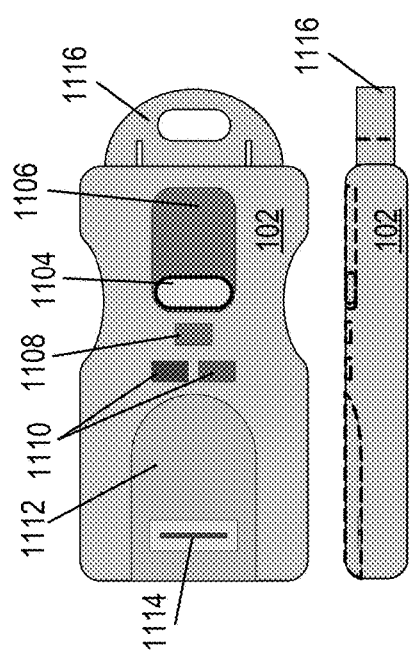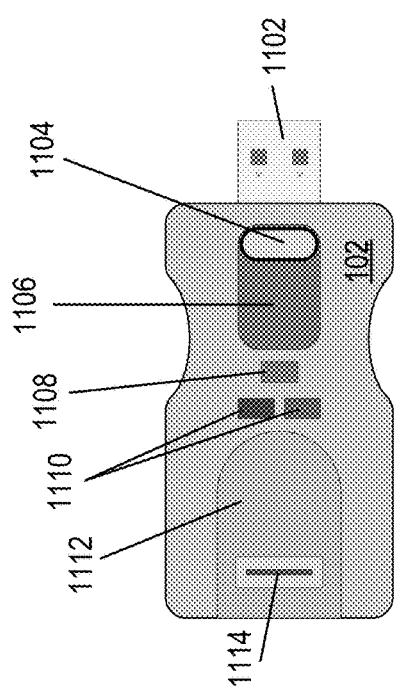

1600

SECURE ELEMENT AS A DIGITAL POCKET

CROSS REFERENCE TO RELATED APPLICATIONS

This application is a continuation of and claims the priority to U.S. application Ser. No. 14/274,711, filed May 10, 2014, titled "Secure Element as a Digital Pocket" which claims the benefit of U.S. Provisional Patent Application No. 61/822,057, filed May 10, 2013, and of U.S. Provisional Patent Application No. 61/864,237, filed Aug. 9, 2013, the entireties of which are hereby incorporated by reference.

Applicants hereby notify the USPTO that the claims of the present application are different from those of the aforementioned related applications. Therefore, Applicant rescinds any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application, the grandparent application or any other related application.

BACKGROUND

A typical individual will frequently participate in activities such as accessing a physical or digital object, securing a physical or digital object, conducting a transaction and storing/retrieving data. Such activities may be facilitated and secured using one or more items carried, for example, in a pocket, by the user. For example, an individual may carry a RFID or Bluetooth key to access and secure his/her home or office and a wireless key fob to access and operate his/her vehicle. The individual may also carry a physical wallet with a government issued identification, cards issued by financial institutions for accessing associated funds or completing transactions, and other cards issued by other entities (e.g. insurance cards, membership cards, rewards cards, etc.). The individual may also carry a storage device, for example, a USB thumb-drive for storing data. The individual may also carry and use a password manager for maintaining passwords for various objects (e.g. user accounts).

What is needed is a single device that consolidates the functionality and replaces the multiple, potentially bulky, items carried by an individual. What is further needed is for the device to be compatible with existing devices and systems in order to provide features and functionality such as authentication and proximity based access thereto.

SUMMARY

According to one innovative aspect of the subject matter described in this disclosure, a system comprises a secure element configured to wirelessly communicate directly with an associated host device, the secure element including a memory storing data and a wireless storage module executable by a processor of the secure element; and the associated host device including a link module executable by a processor, the link module of the associated host device cooperating with the wireless storage module of the secure element to wirelessly mount at least a portion of the memory as a storage drive of the associated storage drive.

Other aspects include corresponding methods, apparatus, systems and computer program products. These and other implementations may each optionally include one or more of the following features. For instance, a biometric sensor configured to obtain physical or behavioral characteristics from a user; and an identification module executable by the processor of the secure element to authenticate the user as an owner of the secure element based on the obtained physical or behavioral characteristic. For instance, one or more of the mounting of the portion of the memory and a user accessing the mounted portion of the memory is responsive successful authentication of the user as the owner of the secure element based on the obtained physical or behavioral characteristic. For instance, the biometric sensor is included in the secure element. For instance, the biometric sensor is included in the associated host device, but available to the secure element as a virtual biometric sensor via an abstraction layer. For instance, the wirelessly mounted portion of the memory appears to the host device as a storage drive physically connected to the host device. For instance, the mounting of the portion of the memory is based on one or more of a user configurable proximity and a user configurable duration of time for the secure element to be in proximity to the associated host device.

In general, another innovative aspect of the subject matter described in this disclosure may be embodied in methods that include presenting, to a secure element, one or more virtual resources; and mapping the one or more virtual resources to one or more available physical resources based on a model architecture for the secure element and to provide hardware abstraction, the available physical resources varying based on the model architecture and an associated host device, the virtual resources allowing consistent interaction with the virtual resources regardless of variation in the physical resources available and their location.

Other aspects include corresponding methods, apparatus, systems and computer program products. These and other implementations may each optionally include one or more of the following features. For instance, the model architecture is a proxy model architecture, the operations further including: mapping a first virtual resource to a first resource on the associated host device, and wherein the mapping allows the secure element to interact with the first virtual resource as if the first virtual resource is a local resource of the secure element, wherein the secure element and the associated computing device are physically separate devices. For instance, the model architecture is a proxy model architecture, the operations further including: performing, at the secure element, a functionality of the secure element, the associated host device wirelessly controlling the performance of the functionality, the secure element performing the functionality on behalf of the associated host device, wherein the associated host device is physically separate from the secure element. For instance, wherein the functionality of the secure element performed is one or more of an authentication and the execution of a financial transaction. For instance, the operations further including determining whether the security element is in proximity to the associated host device; and responsive to determining the secure element is in proximity to the associated host device, permitting access to the associated host device. For instance, the secure element may be associated with one or more additional host devices and permit access to the one or more additional host devices when in proximity to the one or more additional host devices. For instance, the operations further including: determining whether the security element is in proximity to the associated host device; and responsive to determining the secure element is in proximity to the associated host device, wirelessly mounting at least a portion of a memory of the secure element on the associated host device, the mounted portion of the memory appearing as a physically connected storage device at the associated host device. For instance, the secure element may be associated with one or more additional host devices and mounts the portion of the memory to the one or more additional host devices when in proximity to the one or more additional host devices. For instance, the model architecture is a stand-alone model architecture, and the one or more virtual resources are mapped to physical resources available on the secure element. For instance, the model architecture is a stand-alone model architecture, and the one or more virtual resources are mapped to physical resources available on the secure element. For instance, the model architecture is a virtual model architecture, and the one or more virtual resources are mapped to physical resources available on the host device, wherein the secure element is a virtual secure element operating on the associated host device, but appearing to other devices as a separate device. For instance the secure element is platform agnostic and operates the same regardless of a platform the associated host device is operating. For instance, the secure element is a single device that performs functionality of a thumb drive, a physical key, a logical key, a proximity based lock and performs user authentication.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The specification is illustrated by way of example and not by way of limitation in the figures of the accompanying drawings in which like reference numerals are used to refer to similar elements.

FIGS. 11A-C are illustrations of a secure element according to one embodiment.

The figures depict various embodiments for purposes of illustration only. It should be recognized from the following discussion that alternative embodiments of the structures and methods illustrated herein may be employed without departing from the principles described herein.

DETAILED DESCRIPTION

Figure 1:
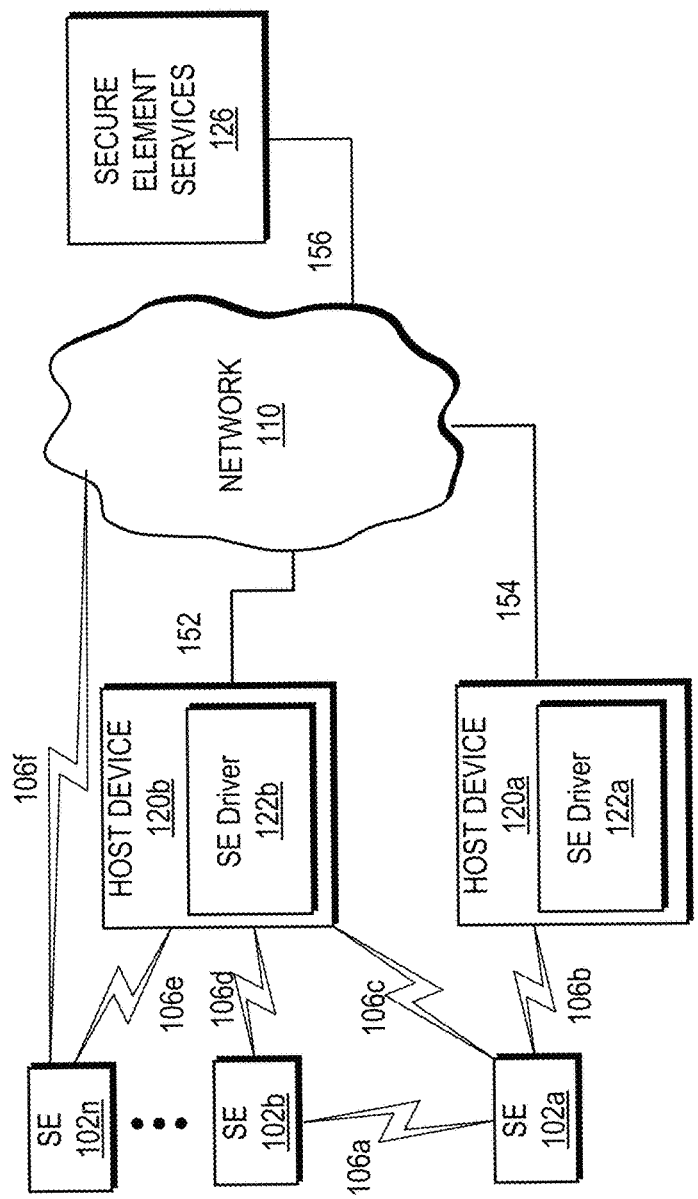
FIG. 1 is a block diagram illustrating an example system with secure elements according to one embodiment.

FIG. 1 is a block diagram illustrating an example system with secure elements according to one embodiment. The illustrated system 100 includes secure elements (SE) 102a, 102b and 102n, host devices 120a and 120b, a network 110, and secure element services 126. In FIG. 1 and the remaining figures, a letter after a specific number, for example "102a" may be a reference to the element having that particular reference number. A reference number without a following letter, for example "102," may be a general reference to the embodiments bearing that reference number.

In the illustrated embodiment, secure element 102a may wirelessly couple for bi-directional, secure communication with SE 102b by signal line 106a, with host device 120a by signal line 106b and with host device 120b by signal line 106c. Secure element 102b may also wirelessly couple for bi-directional, secure communication with host device 120b by signal line 106d. SE 102n may wirelessly couple for bi-directional, secure communication with host device 120b by signal line 106e and with network 110 by signal line 106g. Host device 102a may wirelessly couple for bi-directional, secure communication with SE 102b by signal line 106a, with host device 120b by signal line 106f (e.g. when a host device 120 includes a virtual SE as discussed below) and may couple for communication to network 110 by signal line 154. Host device 102b may couple for communication to network 110 by signal line 152. Secure element services 126 may couple to the network 110 by signal line 156 and provide various services to a host device 120, a SE 102 or both via the network 110.

It should be noted that the signal lines 106 for secure, wireless, bi-directional communication are not necessarily simultaneous. For example, signal line 106a may be established when SE 102a and host device 120a are within detection range and SE 102a may act as a proximity based key to allow access to the host device 120a (e.g. a work computer). Signal line 106a may be subsequently severed and when SE 102a is within detection range of host device 120b (e.g. a personal computer at home) the signal line 106c is established.

The SE 102 is a compact, portable, single point solution for authentication and enabling access. In one embodiment, the SE 102 provides a wireless thumb drive, authentication (including multi-factor and biometric), physical/logical access control and an e-wallet for use in financial transactions in a single device that is capable of replacing many of the items carried by a typical individual including, for example, keys, a wallet (e.g. ID, credit cards, insurance cards, membership cards, loyalty cards, etc.) and a thumb drive. Additionally, the SE 102 combines authentication, proximity sensing and biometrically-triggered interactions to conveniently reduce direct handling of and interaction with the SE 102 while maintaining security. While the illustrated embodiment includes three secure elements 102, the disclosure herein applies to systems including at least one secure element (SE) 102.

The network 110 may provide communication between one or more of an SE 102, a host device 120, secure element services module 126. For example, an SE 102 may communicate location and tracking data to the secure elements services 126 using the network 110 and communication channel 156 via a secure, wireless communication channel 106 to the network 110 or a host device 102.

In one embodiment, the network 110 uses standard communications technologies and/or protocols. Thus, the network 110 can include links using technologies such as Ethernet, 802.11, 802.16, integrated services digital network (ISDN), digital subscriber line (DSL), asynchronous transfer mode (ATM), 3G, 4G, Wi-Fi, etc. Similarly, the networking protocols used on the network 110 can include the transmission control protocol/Internet protocol (TCP/IP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above. In some embodiments, the network 110 may include the Internet and/or the cellular data network.

A host device 120 is a computing device. Examples of host devices 120 include, but are not limited to desktop computers, laptops, tablets, cellular or smart phones, point of sale devices, etc. While the illustrated embodiment 100 includes two host devices 120, some embodiments of a system with secure elements 102 may have a different number of host devices 120 or may lack a host device 120. Additionally, it should be noted that the host devices 120*a* and 120*b* may be a mixture of different types of host devices 120. For example, host device 120*a* may be a smartphone and host device 120*b* may be a desktop computer. Furthermore, the host devices 120*a* and 120*b* may run the same or different platforms, or operating systems. Examples of platforms may include, but are not limited to, Windows, Mac OS, Linux, iOS, Android, Blackberry, Fire OS, etc.

In one embodiment, the host device 120 includes at least one processor (not shown). Depending on the embodiment, the host device 120 may also include other elements including one or more of a memory (not shown), a storage device (not shown), a keyboard (not shown), a graphics adapter (not shown), a pointing device (not shown), a display device (not shown), one or more ports (e.g. serial, USB, Ethernet, etc.), one or more radio transceivers (e.g. Wi-Fi, Bluetooth, 3G/4G, etc.) and one or more sensors (e.g. a biometric sensor).

In the illustrated embodiment, host device 120*a* includes SE driver 122*a* and host device 120*b* includes SE driver 122*b*. In one embodiment, a SE driver is stored in the host device's memory (not shown) and executed by the host device's processor (not shown). The SE driver 122 may facilitate setup of the SE 102, communication with a SE 102 and enable an SE 102 to be associated with the host device 120 and cooperate with the SE 102 to provide the functionality described herein. For example, the SE driver 122 enables the SE 102 to act as a proximity based lock for the host device or a physical or logical asset accessible thereby and to act as a secure, wireless storage device. The SE driver 122 is discussed further with reference to FIG. 10 below.

The host device 120 may also include one or more applications (not shown), which may be stored in the host device's memory (not shown) and executed by the host device's processor (not shown). The one or more applications may use an API and the SE driver 122 to request, control and facilitate some of the functionality provided by the SE 102 as described herein. For example, in one embodiment, a smartphone application for a retailer may use an API and the SE driver 122 to have the SE 102 authenticate the user and complete a financial transaction on behalf of the application.

As is known in the art, a host device 120 can have different and/or other components than those mentioned herein. In addition, the host device 120 can lack certain listed components. As is known in the art, the host device 120 and SE 102 are adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device loaded into the memory, and executed by the processor.

Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 2:
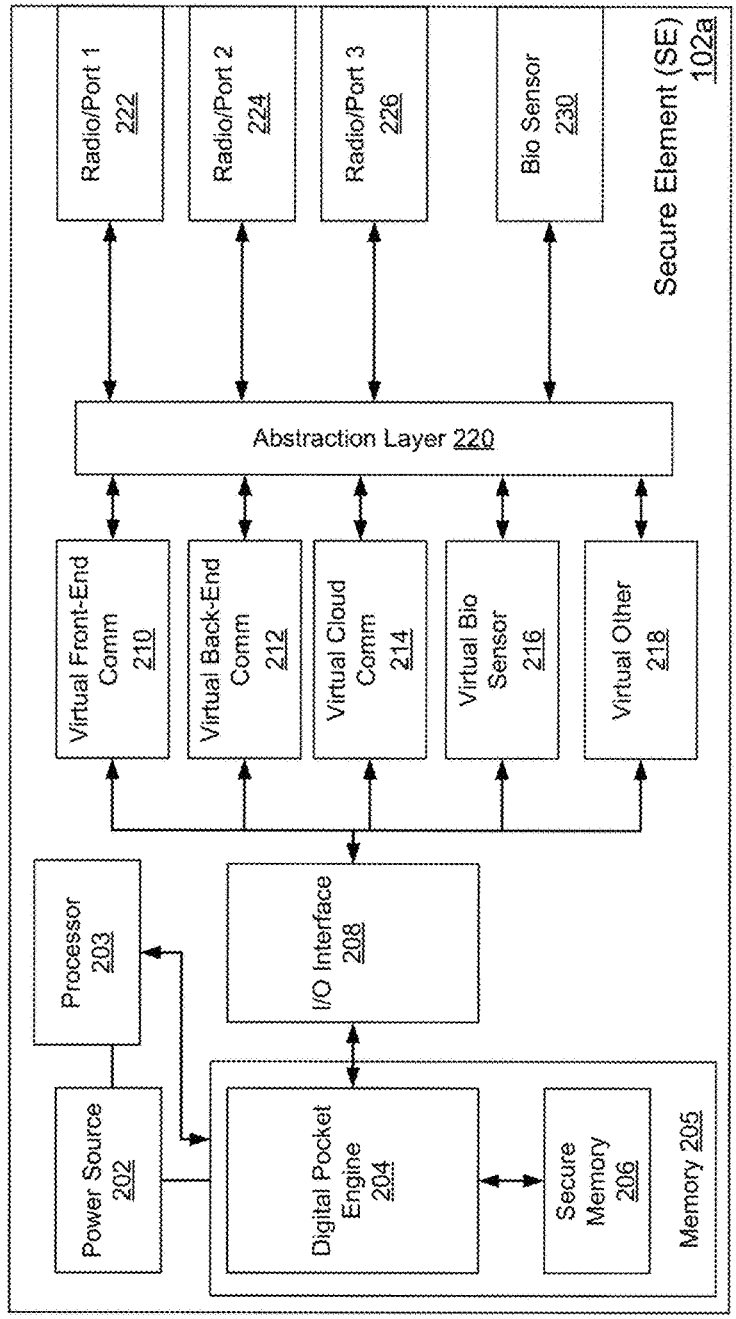
FIG. 2 is a block diagram illustrating an example of a secure element according to one embodiment.

FIG. 2 is a block diagram illustrating an example of a secure element (SE) 102 according to one embodiment. The SE 102 includes a processor 203 and a memory 205. In some embodiments, the SE 102 may include additional elements including a power source 202, an input/output ("I/O") interface 208, radio/port 222/224/226 and a bio sensor 230.

The memory 205 is any device capable of holding data and may include one or more of a hard drive, compact disk read-only memory (CD-ROM), DVD, RAM or a solid-state memory device. The memory 205 may include a read-only memory, a once-programmable memory, a read/write memory or any combination of memory types including physical access secured and tamperproof memories. For example, in one embodiment, the It should be recognized that the preceding are merely examples and other memories may be present and that the memory may be physically or logically partitioned. For example, in one embodiment, the memory 205 is physically partitioned and comprised of multiple memories, e.g., a built-in, solid state memory storing an operating system, unique ID associated with the SE 102 and the digital pocket engine 204, and a removable memory such as a SIM card. In one embodiment, the SIM card is logically partitioned into portions that are controlled by the digital pocket engine 204 and portions that are protected by the digital pocket engine 204. The memory 205 or portions thereof may be secured (i.e. secure memory 206) for example using encryption and other methods.

In one embodiment, there are multiple types of SEs 102. See Appendix A. For example, in one embodiment, an SE 102 may be of a personal security element ("PSE") type or of a general security element ("GSE") type. In one embodiment, an SE's 102 type is determined based on the intended use and the user data stored. For example, a PSE may be intended for personal use and persistently stores user data and biometrics of the owner and a GSE may be intended for general (or non-personal) use and stores no user data and biometrics persistently. In one embodiment, a PSE is carried by a user and associated with the user and a GSE is associated with a device such as check-out station in a business. In one embodiment, both a PSE and a GSE may store in memory 205/206 one or more of a unique ID, public name, available service, Stationary/Mobile, location data and application specific service blocks; however, a PSE may also store biometric data or other personal data of the owner.

The processor 203 executes instructions and routines to perform the functionality of the SE 102 described herein. In one embodiment, the processor 203 is a central processing unit (CPU). The power source 202 may include a battery, such as a rechargeable lithium ("Li") ion battery. In one embodiment, the battery is rechargeable via one of the radio/ports 222/224/226 (e.g. a USB port).

A radio/port 222/224/226 may be a radio transceiver or a port. Examples of radio transceivers may be transceivers for Bluetooth, Wi-Fi, near-field communication (NFC), 3G/4G, DNLA, etc. Examples of ports include USB, mini-USB, micro-USB, serial, Firewire, HDMI, etc. In the illustrated embodiment, three radio/ports 222/224/226 are shown; however, the SE 102 may include one or more radio/ports. Additionally, the radio/ports 222/224/226 may be a mixture of different radio transceivers, ports or both. In one embodiment, at a minimum, a SE 102 includes at least one radio transceiver capable of communicating with other SEs 102.

The bio sensor 230 is a sensor for receiving biometric information describing a physical or behavioral characteristic from a user. For clarity and convenience, the result of fingerprint scan and a fingerprint reader/scanner are occasionally used throughout the description as an example of biometric information and a biosensor 230, respectively. However, the biometrics and bios sensors 230 are not merely limited to fingerprints. Other examples of biometrics include a retinal scan, an iris scan, a facial scan, a voice sample, a signature, DNA, RNA or any other suitable biometric, and the biometric sensor 230 may be a sensor(s) suitable for capturing the biometric (e.g. camera for face, microphone for voice, touch pad for signature, etc.).

The I/O interface 208 is an interface between the digital pocket engine 204 and the radio/ports 222, 224, 226 and bio sensor 230. In one embodiment, the SE 102 includes an abstraction layer 220 that enables the I/O interface 208 to utilize resources without regard to those resources' physical attributes, settings or locations.

In one embodiment, the abstraction layer 220 does this by presenting virtual, consistent resources 210, 212, 214, 216, 218 to the I/O interface 208, announces the secure element architecture (discussed below with reference to FIGS. 3-8), announces the onboard resources and requested resources to another device (e.g. another SE 102 or a host device 120), and maps the virtual resources 210, 212, 214, 216, 218 to available, on-board resources and, when requested and permitted by the secure element architecture, to resources of another device.

For example, certain actions in the system 100 may require that the user provide biometric information for authentication. In some embodiments, depending on the action being taken or the SE(s) 102 and host device(s) 120 involved in the action, a user may be required to provide the biometric information locally (e.g. using the bio sensor 230 on his/her SE 102), or remotely (e.g. using the bio sensor on another user's SE 102 or on a host device 120 and received at the SE 102 via a port/radio 222/224/226). In one embodiment, the abstraction layer 220 maps the virtual bio sensor 216 to the appropriate sensor whether the local bio sensor 230 or a remote sensor (e.g. via radio/port 1 222) and the I/O interface 208 interacts with the received biometric information the same regardless of whether the user's biometric information is obtained locally or remotely.

As previously alluded to, the SE 102 is capable of operating using a variety of model architectures. In one embodiment, the architectural variants include stand-alone model without an external communication link (See FIG. 3), stand-alone model with an external communication link (See FIG. 4), proxy model without sharing resources (See FIG. 5), proxy with sharing resources (FIG. 6), virtual, stand-alone model without an external communication link (See FIG. 7) and virtual, stand-alone model with an external communication link (See FIG. 8). It should be noted that "external communication link" as used with respect to the model architectures refers to whether the SE 102 a communications link exists with an external host device 120.

Figure 3:
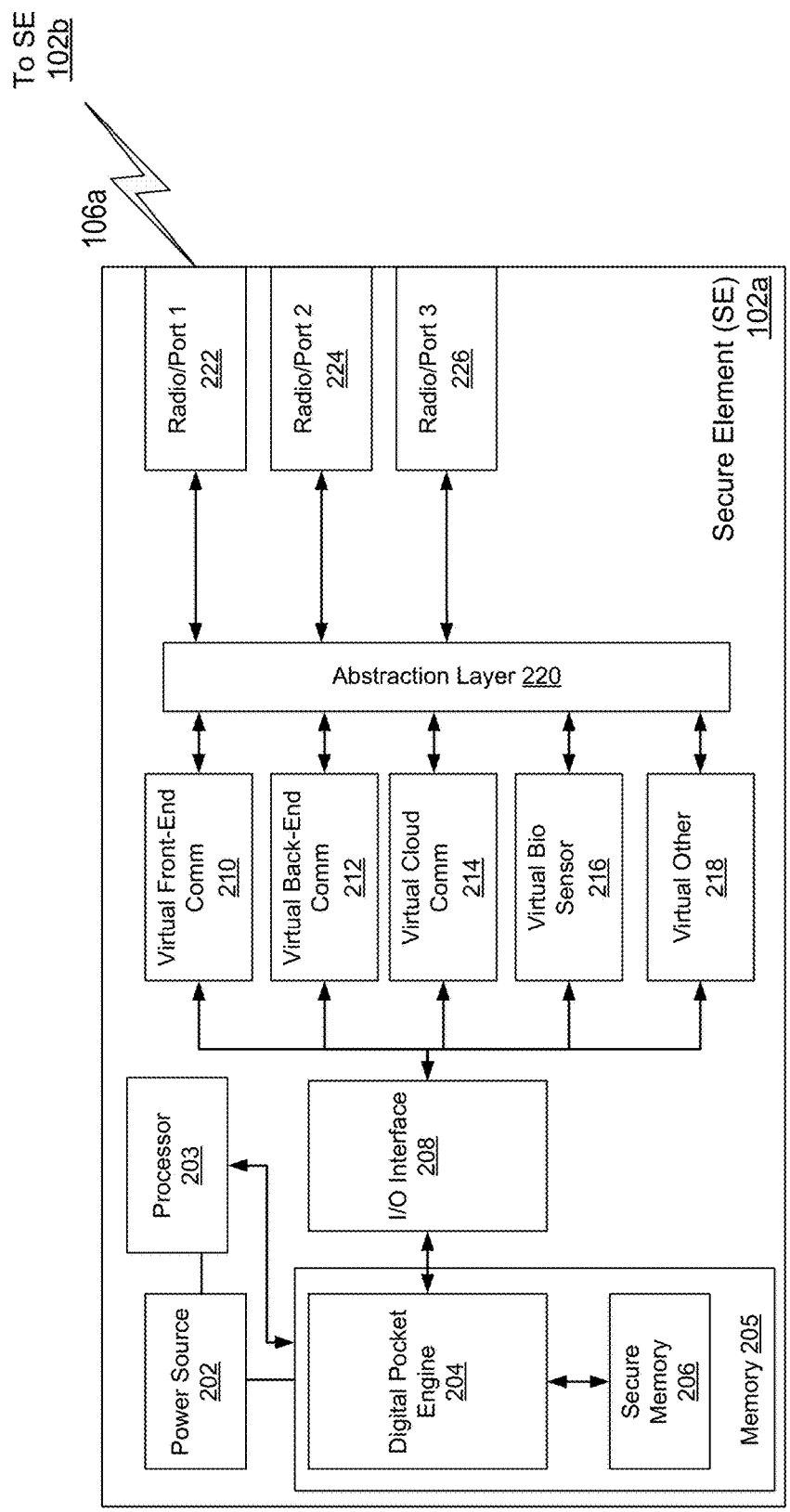
FIG. 3 is a block diagram illustrating a stand-alone model variant of the secure element architecture according to one embodiment.
Figure 4:
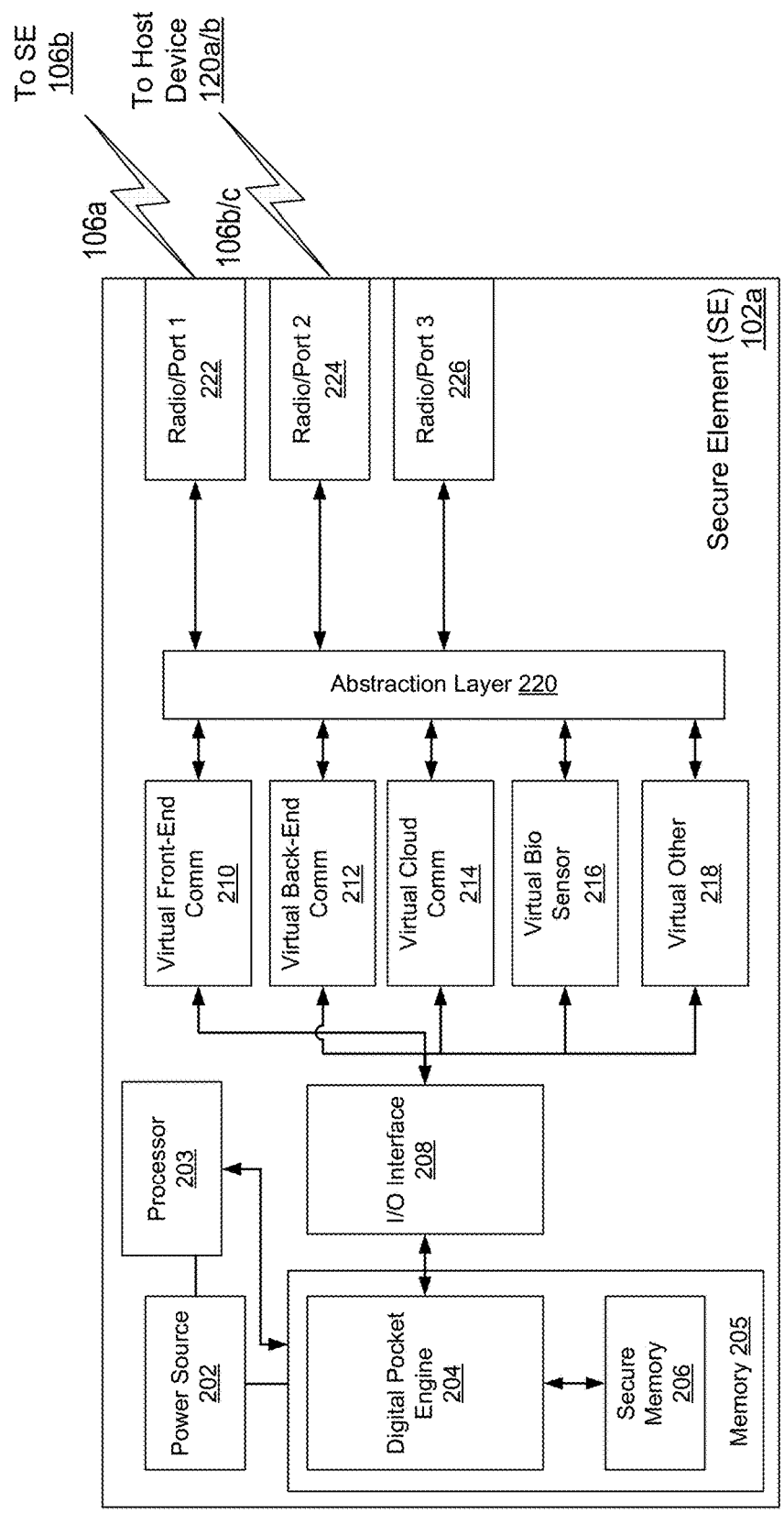
FIG. 4 is a block diagram illustrating a stand-alone model variant of the secure element architecture according to another embodiment.
Figure 5:
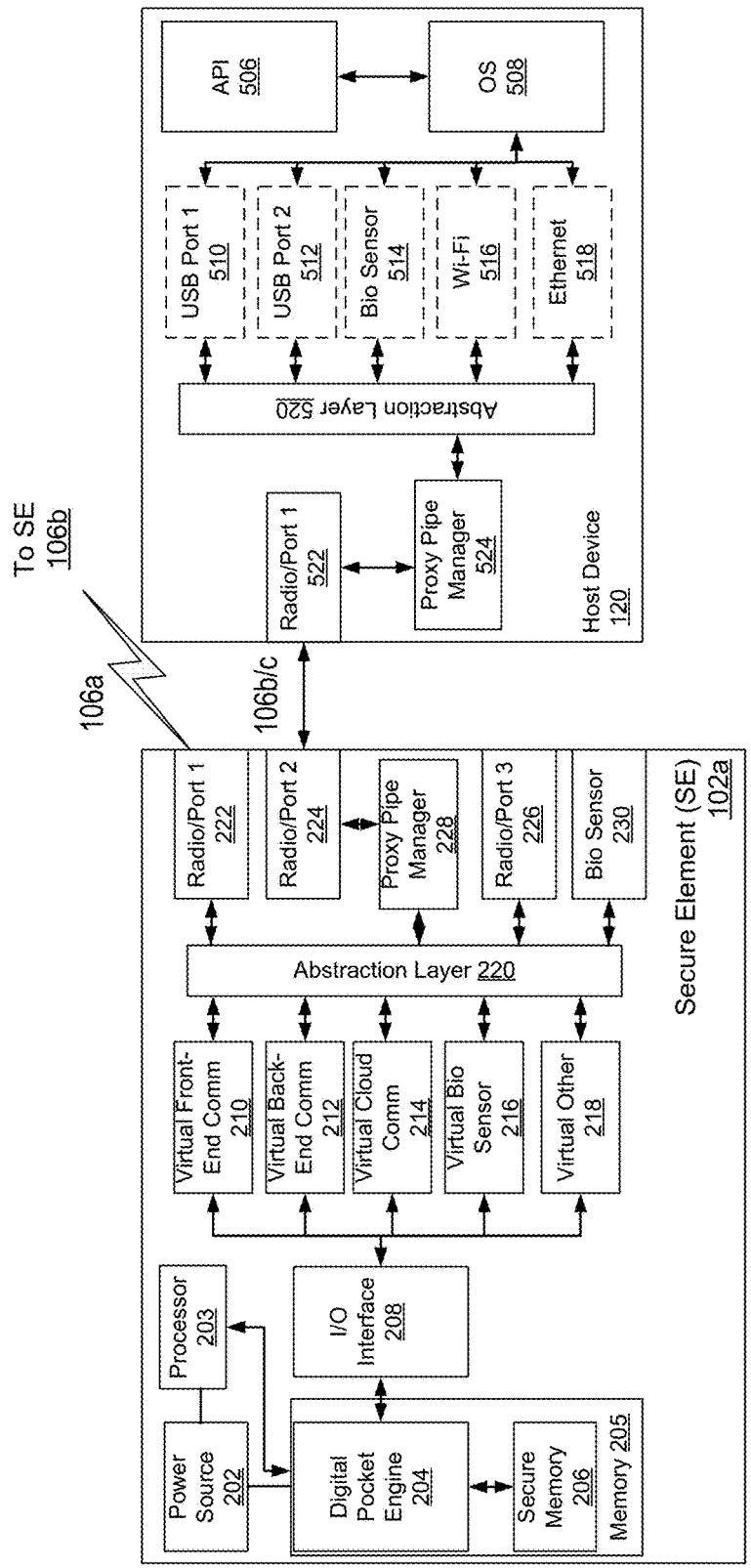
FIG. 5 is a block diagram illustrating a proxy model variant of the secure element architecture according to one embodiment.
Figure 6:
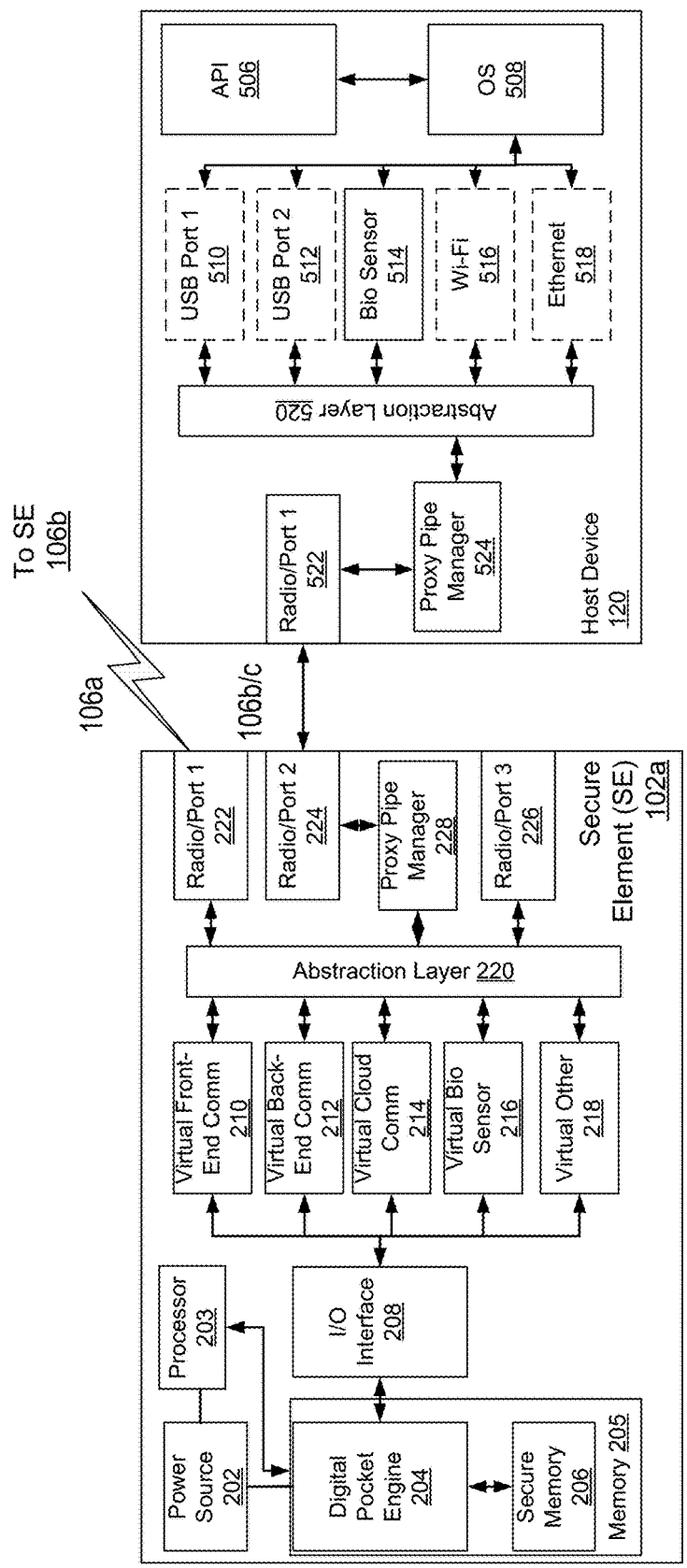
FIG. 6 is a block diagram illustrating a proxy model variant of the secure element architecture according to another embodiment.
Figure 7:
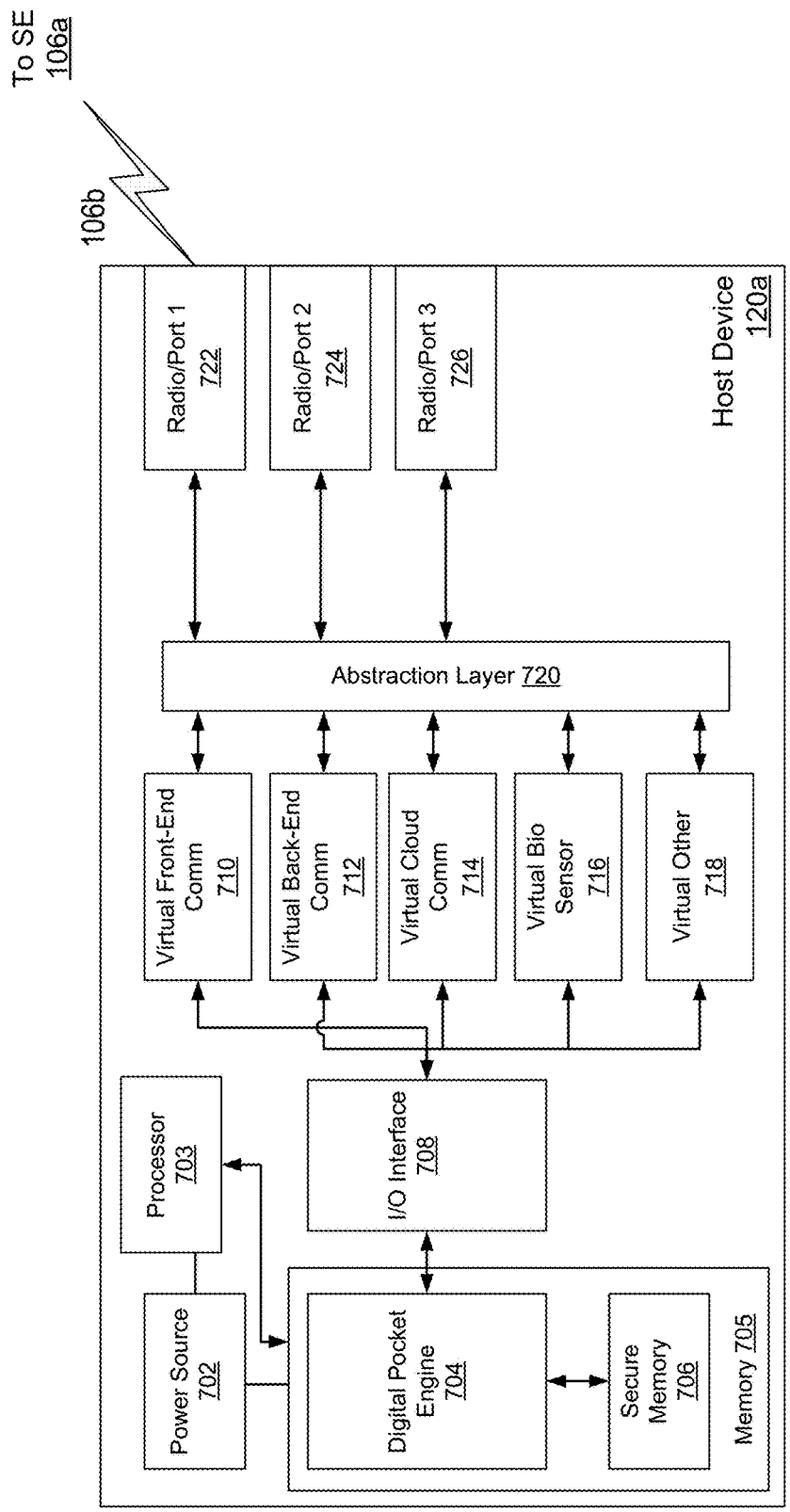
FIG. 7 is a block diagram illustrating a virtual model variant of the secure element architecture according to one embodiment.
Figure 8:
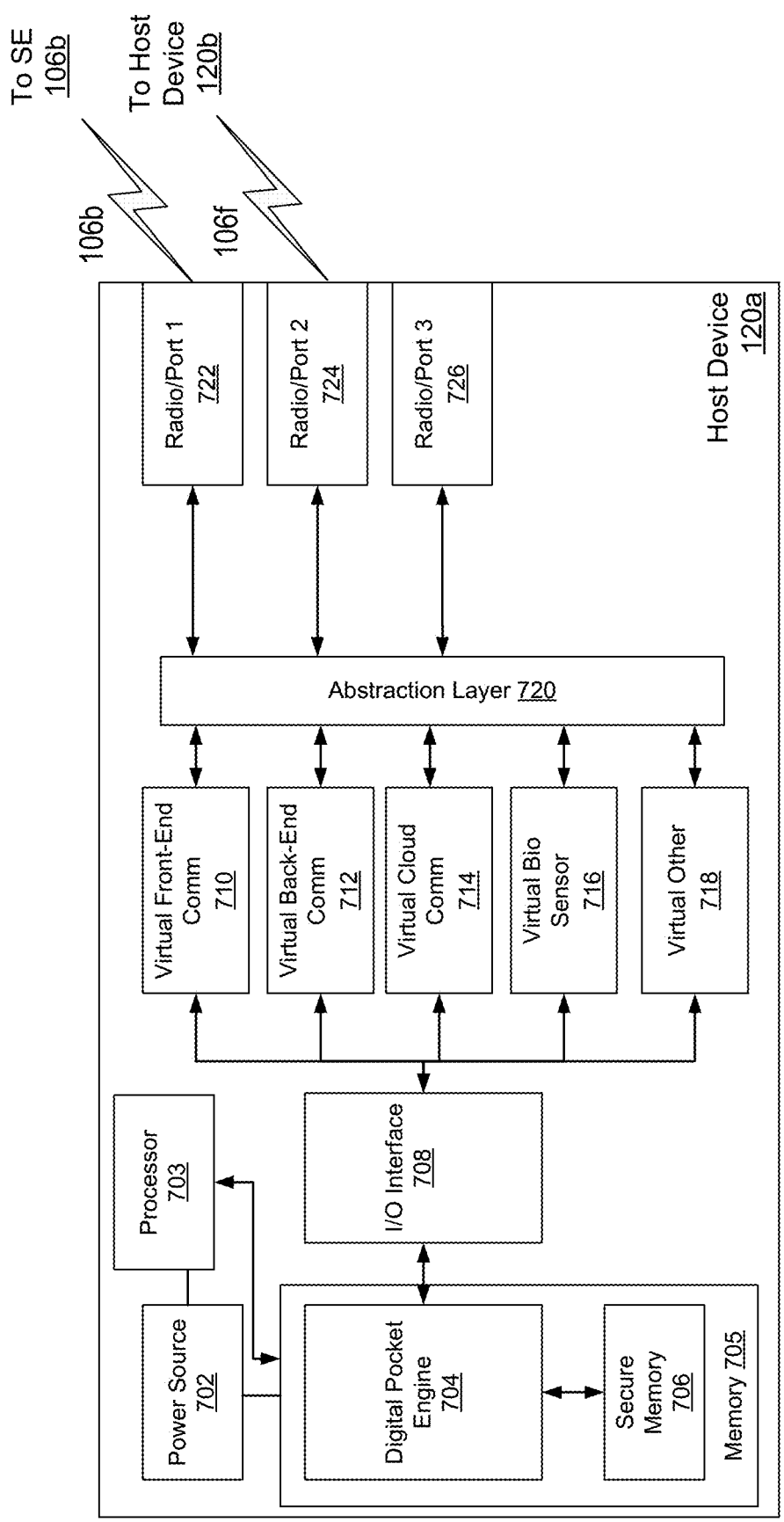
FIG. 8 is a block diagram illustrating a virtual model variant of the secure element architecture according to another embodiment.

FIG. 3 is a block diagram illustrating a stand-alone model without an external communication link variant of the secure element architecture according to another embodiment. FIG. 4 is a block diagram illustrating a stand-alone model with an external communication link variant of the secure element architecture according to another embodiment. FIG. 5 is a block diagram illustrating a proxy model without sharing resources variant of the secure element architecture according to one embodiment. FIG. 6 is a block diagram illustrating a proxy model with sharing resources variant of the secure element architecture according to another embodiment. FIG. 7 is a block diagram illustrating a virtual model without an external communication link variant of the secure element architecture according to one embodiment. FIG. 8 is a block diagram illustrating a virtual model with an external communication link variant of the secure element architecture according to another embodiment. See Appendix A.

Before discussing the variants of the secure element architecture, it is worth mentioning that, regardless of the secure element architecture, the SE 102 is able to perform the same core functionality including, multi-factor/multi-type authentication with or without biometrics and with or without utilizing a cloud-based central registry, secure access control, secure transactions, location tracking, and secure data storage services.

Referring now to FIGS. 3 and 4, in the stand-alone model architecture, the SE 102 uses its own, local resources and logic to perform the core, functionalities such as multi-factor/multi-type authentication with or without biometrics and with or without utilizing a cloud-based central registry, secure access control, secure transactions, location tracking, and secure data storage services. When the SE 102 uses this architecture, the abstraction layer 220 maps the virtual resources 210, 212, 214, 216, 218 thru to the SE's 102 (local) sensors, radios, and ports.

Referring now to FIGS. 5 and 6, in the proxy model architecture, according to one embodiment, the host device 120 may control, access and interact with the SE 102. For example, an application on the host device 120 may control the SE 102 to authenticate the user, and upon successful authentication of the user, use information of the SE 102's e-wallet (e.g. a credit line) to conduct a financial transaction on behalf of the host device 120. In the proxy model architecture, according to one embodiment, the SE 102 may control, access and interact with the host device 120. For example, the SE 102 may independently authenticate a user biometrically and/or using a central registry and lock/unlock a door, an automobile, or any number of other associated host devices 120. In the proxy model architecture, according to one embodiment, the host device 120 and SE 102 may share (virtualize) a resource of the host device 120. For example, assume the host device 120 has a sensor that the SE 102 does not (e.g. a retinal scanner); in one embodiment, the proxy model architecture allows that sensor of the host device 120 to serve its role as if directly built into the SE 102. Therefore, the proxy model architecture opens up many new roles and capabilities.

Referring now to FIGS. 7 and 8, in the virtual, stand-alone model architecture, the host device 120 installs software (not shown) and the software provides virtualized SE functionality, i.e., the virtual SE software uses the host device's 120 sensors, ports, and memory to create what appears to be a stand-alone SE to any other device interacting with it. This virtual architecture may be useful for host devices 120 such as existing smartphones, tablets and other computing devices where convenience and ease are more important than maximized security.

A distinction between the proxy model architecture and the virtual, stand-alone model architecture is the location of the SE's secure memory 206 and SE-to-SE radio. The proxy model architecture maintains these elements in the SE 102 device, but in the virtual, stand-alone model architecture, these elements are included in the host device 120. An advantage of the stand-alone and proxy model architectures is that the SE related data is in the SE 102 and separate from the host device 120. This makes upgrading a host device (e.g. a smartphone) a non-issue as the user's data (e.g. biometrics and other secure data such as the data from the phone's applications, contact list, etc.) is stored on the SE 102 and not on the host device 120. Therefore, a user need only install the SE driver 122 on the new host device 120 and associate the SE 102 with the new host device 120. In one embodiment, the SE 102 storing other secure data may allow a user to use another individual's device without worrying about security. For example, in one embodiment, the user's contact list is stored to the SE 102, so when the user picks up any host device 120 with the SE driver 122 installed, the user can access that contact list on the host device 120, and perhaps even place a call, text, retrieve data using his/her phone plan and billing information.

The SE 102 may use different secure element architectures at different times in different scenarios, sometimes referred to as a balanced model. For example, in one embodiment, the SE 102 could act use the stand-alone architecture to act as a purchaser in a first transaction and use the proxy architecture to act as a merchant in a second transaction. In another example, in one embodiment, the balanced model allows two SEs 102 (e.g. a GSE and a PSE) to participate in a single transaction. Thus, the SE 102 may fulfill the roles of both the mobile component and stationary component, which typically are distinct, dedicated devices in other systems and often in those other systems the mobile component may not directly communicate with a host device, but must communicate with the stationary component that is integrated into or coupled to a host device.

Figure 9:
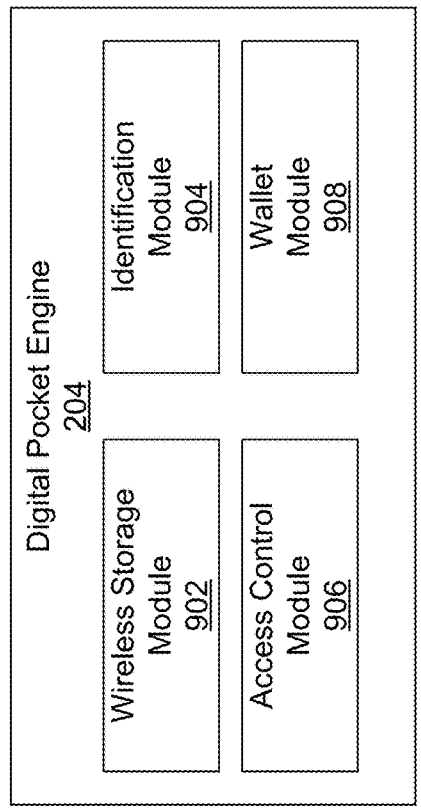
FIG. 9 is a block diagram illustrating an example of a digital pocket engine according to one embodiment.

FIG. 9 is a block diagram illustrating an example of a digital pocket engine 204 according to one embodiment. In one embodiment, the digital pocket engine 204 includes a wireless storage module 902, an identification module 904, an access control module 906 and a wallet module 908. In one embodiment, the modules of the digital pocket engine 204 are coupled to each other via a bus (not shown). Persons having ordinary skill in the art will recognize that some of the modules could run as separate applications on a SE 102.

The wireless storage module 902 can be software including routines for enabling the SE 102 to act as a wireless, portable data store. In some embodiments, the wireless storage module 902 can be a set of instructions executable by the processor 203 of the SE 102 to provide the functionality described below for wireless, portable data storage. In some embodiments, the wireless storage module 902 can be stored in the memory 205 of the SE 102 and can be accessible and executable by the processor 203. In some implementations, the wireless storage module 902 can be adapted for cooperation and communication with the processor 203 and other components of the SE 102.

Existing thumb drives must be physically connected (e.g. using a USB port) to a host device 120 (e.g. a personal computer) in order to access or modify the data stored on the thumb drive. Such devices are less than ideal. For example, a user must physically interact with the thumb drive to retrieve the thumb drive from a pocket, locate a compatible physical connection (e.g. a USB port) on the host device 120 if there even is one, orient the physical connections of the thumb drive to that of the host device 120 and create the physical connection. Such interactions may be inconvenient for a number of reasons. For example, the user has many/large/full pockets and must sift through the contents to locate the thumb drive; the physical connections of the host device 120 may be inconveniently located (e.g. on the back of a personal computer tower located under a desk), and the thumb drive may be left behind or forgotten by the owner when the owner is finished. In some embodiments, the SE 102 and the functionality provided at least in part by the wireless storage module 902 beneficially reduce or eliminate one or more of the inconveniences associated with existing thumb drives.

The wireless storage module 902 provides wireless, portable data storage functionality. In one embodiment, the wireless storage module 902 of the SE 102 determines whether the SE 102 is in proximity to an associated host device 120, i.e., a host device 120 with which the SE has a relationship or is "associated" with. For example, assume a first user owns SE 102*b* and host device 120*b* and has associated SE 102*b* with host device 120*b*; in one embodiment, the wireless storage module 902 determines when SE 102*b* is in proximity to host device 120*b*.

In one embodiment, the proximity is determined based on a metric satisfying a threshold, for example, a signal strength of a wireless connection between the SE 102 and the host device 120. In one embodiment, the proximity may be a variable threshold. For example, so that a SE 102 needs to be closer to a first host device 120 than a second host device 120 to be determined proximate. Such an embodiment, may beneficially provide greater security by requiring that a user be closer to a host device 120 that is portable or used publicly (e.g. a cellular phone) than to a stationary or private host device (e.g. a desktop computer in a user's private bedroom). Depending on the embodiment, the proximity threshold varies based on one or more of any number of factors including, for example, a user preference, the host device 120, the type of host device 120, etc.

In one embodiment, wireless storage module 902 wirelessly mounts the memory 205 of the SE 102 or a portion thereof as storage drive on the associated host device 120 in proximity. In one embodiment, the wireless storage module 902 automatically mounts at least a portion of the SE 102 memory 205 as a drive of the host device 120 responsive to determining the host device 120 is within proximity. In one embodiment, the wireless storage module 902 may require one or more triggers prior to mounting, for example, to prevent potential repeated, unwanted or unnecessary mounting as the user walks with a SE 102 in and out of proximity to the host device 120. Examples of triggers may include biometric authentication (e.g. the user swiping his or her finger on a fingerprint reader), a duration of time for the SE 102 to be in proximity being satisfied (which may or may not be user adjustable), etc.

In one embodiment, the mounted portion of the SE's memory 205 is treated by the host device 120 as if it was an internal drive or a physically connected thumb drive and allows data (e.g. files, documents, etc.) to be read from and written to the memory 205 as such while the SE 102 remains in the user's pocket, purse, backpack, etc. Therefore, the wireless storage module 902 revolutionizes the carrying of digital content by making the process easier, quicker and more secure.

In one embodiment, the wireless storage module 902 may interact with the identification module 904 to require biometric authentication. For example, the identification module 904 of the SE 102 may authenticate a fingerprint before mounting the portion of the memory 205 or allowing a user to access the mounted portion of the memory 205.

The identification module 904 can be software including routines for performing authentication. In some embodiments, the identification module 904 can be a set of instructions executable by the processor 203 of the SE 102 to provide the functionality described below for authentication. In some embodiments, the identification module 904 can be stored in the memory 205 of the SE 102 and can be accessible and executable by the processor 203. In some implementations, the identification module 904 can be adapted for cooperation and communication with the processor 203 and other components of the SE 102.

In one embodiment, the identification module 904 manages identifying information, e.g., biometrics, name, address, phone number, driver's license, passport, social security number, business card, insurance cards, etc., stored on the SE 102, thereby potentially and beneficially eliminating the need for the owner user to carry such items in a wallet or pocket. In one embodiment, as described above with reference to the proxy model architecture, the identification module may perform authentication on behalf of the host device 120 or application thereof.

In one embodiment, the identification module 904 performs authentication. In one embodiment, the identification module 904 performs authentication using one or more factors including, for example, one or more of a device, a user, an application and a registry or other trusted third party. Upon successful authentication, the SE 102 establishes a secure, wireless communication channel 106 over which data may be securely exchanged.

In one embodiment, the identification module 904 performs device authentication (i.e. SE-to-SE authentication). See Appendix B. For example, in one embodiment, when SEs (e.g. SE 102a and SE 102b) detect one another they automatically establish a secure, wireless communication link (e.g. 106a) and exchange information and based on that information confirm the other device is a valid SE 102.

In one embodiment, the identification module 904 performs user authentication (i.e. SE-to-User authentication). See Appendix B. For example, in one embodiment, the identification module 904 may require that the user provide biometric information by interaction with a bio sensor 230 and authenticate the user the identification module determines that the biometric information of the user matches that of the owner of the SE 102 stored during setup of the SE 102.

In one embodiment, the identification module 904 performs application authentication (i.e. SE-to-App authentication). See Appendix B. For example, in one embodiment, the identification module 904 sends data to an application on the host device 120 for the application to authenticate that the SE 102 is a valid device. In another example, in one embodiment, the identification module 904 may receive data (e.g. a certificate or checksum) from an application of the host device 120 that verifies the application is valid (e.g. is valid and has not been altered).

In one embodiment, the identification module 904 performs registry authentication (i.e. SE-to-Registry authentication). See Appendix B. For example, in one embodiment, the identification module 904 sends data to a registry (e.g. a central registry) and receives from the registry a determination whether the SE 102 is in good standing, is lost, stolen, etc.

The authentication performed by the identification module 904 may depend on a service the SE 102 is providing. In one embodiment, services include private services and external services. For example, in one embodiment, private services are further categorized as owner/personal (OP) and multi-party (MP) and external services include a third party trusted (TPT) category. See Appendix B.

In one embodiment, Private-OP services are services that require the owner of the SE 102 to accept. In one embodiment, an owner accepts a Private-OP service by being biometrically authenticated. For example, the user swipes his or her finger on the fingerprint reader of their SE 102 and upon authentication, the service is available or provided. Examples of Private-OP services may include storing or accessing private files on the SE 102 or host device 120 or accessing a host device 120 (e.g. via the wireless storage module 902); and accessing devices, equipment, doors, websites, applications, filling out online forms, etc. (e.g. via the access control module 906).

In one embodiment, Private-MP services are services that require multiple parties to accept. In one embodiment, the multiple parties may accept the Private-MP service by being biometrically authenticated. For example, each user swipes his or her finger on the fingerprint reader of his/her own SE 102 (or depending on the embodiment, another user's SE 102 and the biometric information is exchanged for authentication) and upon biometric authentication of each user by the user's SE 102, the service is available or provided. Examples of Private-MP services may include storing or accessing private files on the SE 102 or host device 120 or accessing a host device 120 (e.g. via the wireless storage module 902); and accessing devices, equipment, doors, websites, applications, filling out online forms, etc. (e.g. via the access control module 906).

In one embodiment, Public-TPT services are services that require acceptance by a trusted third party. In one embodiment, the service is accepted/approved when an owner provides biometric information at the accepting party's SE 102. For example, assume user 1 wants to approve a secure file transfer to user 2 (i.e. the accepting party); in one embodiment, user 1 swipes his finger on the fingerprint reader of user 2's SE 102. In another example, a user swipes his or her finger on the fingerprint reader of an SE 102 associated with the trusted third party (e.g. an SE 102 belonging to a notary agent of the trusted third party).

Examples of Public-TPT services may include transferring secure files (e.g. via the wireless storage module 902), performing secure transactions (e.g. via wallet module 908), and accessing public devices, equipment, doors, etc. (e.g. via the access control module 906).

The access control module 906 can be software including routines for enabling access control. In some embodiments, the access control module 906 can be a set of instructions executable by the processor 203 of the SE 102 to provide the functionality described below for access control. In some embodiments, the access control module 906 can be stored in the memory 205 of the SE 102 and can be accessible and executable by the processor 203. In some implementations, the access control module 906 can be adapted for cooperation and communication with the processor 203 and other components of the SE 102.

The access control module 906 enables the SE 102 to act as a proximity based key allowing access when in proximity and disallowing access when the SE 102 is not in proximity. The access control module 906 and the functionality provide thereby allows the SE 102 to replaces logical keys (e.g. username and passwords, PINs, etc.) and physical keys (e.g. car key fob, home and office keys including RFID keys, Bluetooth key, smart cards, etc.)

In one embodiment, the access control module 906 provides automated password management. In one embodiment, the access control module 906 automatically and invisibly fills in usernames and passwords when visiting websites, using apps, etc.

In one embodiment, the access control module 906 enables the SE 102 to act as a wireless, proximity based key to access and secure an associated host device 120 or other asset. Such access control beneficially makes a lost or stolen host device 120 unusable. Depending on the embodiment, the access control module 906 may secure and provide access to a host device 120 in one or more ways. In one embodiment, the operating system of the host device 120 may not be able to boot without the SE 102 in proximity. In one embodiment, the hard drive or other memory of the host device 120 may be encrypted and unusable when the SE 102 is not in proximity to provide the decryption key. In one embodiment, the access control module 906 automatically provides a username and password to log into an account on the host device 120. For example, the access control module 906 auto completes the windows login on a host device 120 running the windows platform.

The proximity used for access control may be the same proximity as that used by the wireless storage module 902 or a different proximity depending on the embodiment. In one embodiment, the access control module determines proximity for access control similar to what is described with reference to the wireless storage module 902 above.

The wallet module 908 can be software including routines for enabling the SE 102 to serve as an e-wallet and participate in financial transactions. In some embodiments, the wallet module 908 can be a set of instructions executable by the processor 203 of the SE 102 to provide the functionality described below to serve as an e-wallet and participate in financial transactions. In some embodiments, the wallet module 908 can be stored in the memory 205 of the SE 102 and can be accessible and executable by the processor 203. In some implementations, the wallet module 908 can be adapted for cooperation and communication with the processor 203 and other components of the SE 102.

The wallet module 908 may store and manage electronic versions of one or more of the SE 102 owner's credit cards, debit cards, loyalty cards, membership cards, coupons and rewards cards, thereby eliminating the user's need to carry those items in his/her pocket or wallet.

In one embodiment, the wallet module 908 completes financial transactions. For example, the wallet module may complete a financial transaction responsive to the identification module 904 receiving approval and performing biometric authentication. In one embodiment, as described above with reference to the proxy model architecture, the wallet module 908 may perform financial transactions on behalf of the host device 120.

In one embodiment, the wallet module 908 and identification module 904 enable biometrically triggered transactions. See Appendix A. In one embodiment, an SE 102 will automatically detect and initiate a connection to another SE 102 in range and, as mentioned, certain transactions may require a user to use a bio sensor of a host device 120 or another SE 102 (i.e. not the PSE of the user). When multiple SE 102 devices are within range of the device receiving the biometric information, the issue becomes determining which SE 102 is the SE 102 of the user that provided the biometric information in order to proceed with the transaction. In one embodiment, a SE 102 automatically and algorithmically matches received biometric information to the correct SE 102 for authentication. In one embodiment, when an SE 102 detects another SE 102 in range, the two SEs 102 automatically connect and communicate. In one embodiment, an SE 102 that is a PSE may send a biometric sample to the other SE 102 upon connecting.

As mentioned above, a PSE may store biometric information of the PSE's owner (e.g. data representing the owner's fingerprint). In some embodiments, the PSE also stores a sample, i.e. a subset, of that biometric information (e.g. data representing a portion of the owner's fingerprint). The biometric information and biometric sample may be created during setup of the PSE. In one embodiment, the biometric information and biometric sample may be created using one-way hash so that the user biometrics (e.g. fingerprint) cannot be recreated from them.

In one embodiment, a SE 102 may buffer the biometric samples it receives from other SEs 102 along with information identifying which SE 102 each biometric sample belongs to (e.g. by associating the sample with a unique identifier of the sending SE 102). When a bio sensor of the buffering SE 102 is used and receives biometric information, in one embodiment, the SE 102 compares the biometric information to the buffered biometric samples and, depending on the embodiment, its own biometric sample when the SE 102 is a PSE and determines whether the received biometric information matches a sample. When a match is made the biometric information received from the bio sensor is sent to the identified SE 102 where the biometric information is authenticated by the identified SE 102. Upon authentication, the SE 102 completes a transaction.

Such biometrically triggered transactions beneficially allow a user to initiate and complete a transaction merely by interacting with a bio sensor. For example, assume an individual with a PSE is checking out at a store and there is a line of other individuals each carrying their own PSE. The individual checking out may interact with a bio sensor on a GSE at the point of sale (e.g. swipe his or her finger) and automatically initiate and complete the payment process without the individual having to retrieve his/her PSE or take any other actions.

Figure 10:
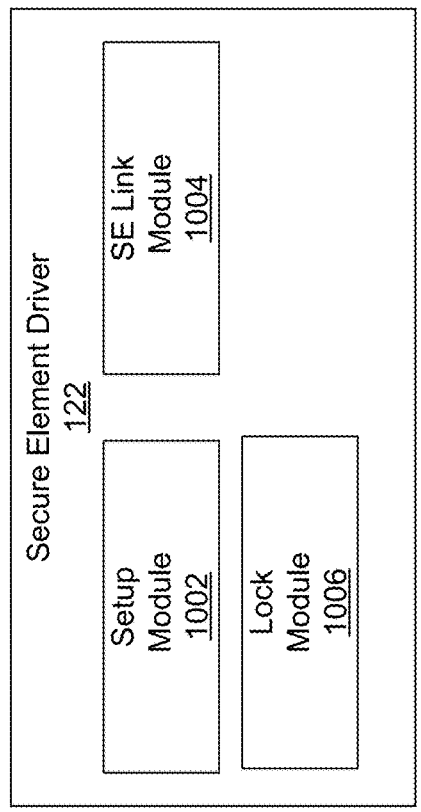
FIG. 10 is a block diagram illustrating an example of a secure element driver according to one embodiment.

FIG. 10 is a block diagram illustrating an example of a secure element driver 122 according to one embodiment. The SE driver 122 may be a software application installed onto the host device 120. In one embodiment, the SE driver 122 is platform agnostic and may be installed on any popular host device 120 platform, for example, Windows, Mac, Android, iOS, Blackberry, etc. In another embodiment, multiple SE drivers 122 for various host device 120 platforms may exist and the appropriate SE driver 122 for the host device's platform is installed on the host device 120. Regardless of the embodiment, the SE 102 functions identically regardless of the host device's platform and is occasionally said to be platform agnostic or device independent. The platform independence and the implementation of the SE as either a separate device 102 or as a virtual SE on the host device beneficially provide for a system with unprecedented versatility. For example, the SE system 100 may be implemented with currently existing host devices 120 without modification to their hardware. For example, the SE 102 herein may work with a current smartphone, tablet and laptop to provide after-market proximity based access control to all without requiring any proprietary or specialized hardware being installed during manufacture of those devices.

In one embodiment, the secure element driver includes a setup module 1002, a SE link module 1004 and a lock module 1006. In one embodiment, the modules of the secure element driver 122 are coupled to each other via a bus (not shown). Persons having ordinary skill in the art will recognize that some of the modules could run as separate applications on a host device 120.

The setup module 1002 can be software including routines for setting up a SE 102. In some embodiments, the setup module 1002 can be a set of instructions executable by a processor (not shown) of the host device 120 to provide the functionality described below for setting up a SE 102. In some embodiments, the setup module 1002 can be stored in a memory (not shown) of the host device 120 and can be accessible and executable by its processor (not shown). In some implementations, the setup module 1002 can be adapted for cooperation and communication with the processor (not shown) and other components of the host device 120 and with the SE 102.

Once the SE driver 122 is installed, an owner of a SE 102 may associate his/her SE 102 with the host device 120. In one embodiment, a host device 120 may be associated with one or more SE 102s. An association between a host device 120 and an SE 102 is a relationship that allows some of the functionality described above. For example, proximity based access to the host device 120 and wireless data access of data stored on the SE 102 by the host device 120 both require that the SE 102 and host device 120 be associated according to one embodiment and will not occur absent the association.

The setup module 1002 allows a user to setup a new SE 102. For example, in one embodiment, the setup module 1002 provides a user a wizard and/or GUIs which guide the user in the SE 102 setup and obtain the required information. For example, the setup module 1002 prompts the user to enter basic info and swipe a bio sensor. The biometric information is permanently and securely stored on the SE 102 (e.g. in a write only portion of the secure memory 206) and subsequently used for biometric authentication. Once SE 102 is setup, a user need only carry (e.g. in a pocket) the SE 102 and swipe his or her finger when proof of ownership is required.

In one embodiment, the setup module 1002 may include software for implementing a virtual SE on the host device 120 as discussed with reference to the virtual model architecture. In another embodiment, the software for implementing a virtual SE on the host device 120 is software (not shown) that is separate from the SE driver 122 and the setup module 1002.

The SE link module 1004 can be software including routines for extending the functionality and capabilities of an SE 102 to a host device 120. In some embodiments, the SE link module 1004 can be a set of instructions executable by the processor (not shown) of the host device 120 to extend the functionality and capabilities of an SE 102 to the host device 120. In some embodiments, the SE link module 1004 can be stored in the memory (not shown) of the host device 120 and can be accessible and executable by the processor (not shown). In some implementations, the SE link module 1004 can be adapted for cooperation and communication with the processor (not shown) and other components of the host device and with the SE 102.

The link module 1004 extends the capabilities of the SE 102 to an associated host device 120. In one embodiment, the link module 1004 contributes to enabling the proxy model architecture discussed above. For example, the link module 1004 contributes to enabling the host device 120 to control the SE 102 and/or contributes to enabling a SE 102 to share a resource of the host device 120 as if the resource was local to the SE.

In one embodiment, once a SE 102 is linked to an associated host device 120, the SE 102 appears to the host device's application(s) as if the SE 102 was built into the host device 120 similar (from the host device's perspective) to any other sensor or hardware of the host device 120. In one embodiment, the link module 1004 achieves this extension of capabilities by using its own abstraction layer on the host device 120 side. For example, referring to FIGS. 5 and 6, the abstraction layer 520 may map the SE 102 connected wirelessly via radio/port 1 522 to locally available resources. For example, the abstraction layer 520 may map the secure element to USB port 1 510, so that the SE 102 appears to the host device 120 and its applications the same a thumb drive plugged into USB port 1 of the host device 120. The proxy pipe managers 228, 524 act as conduits over which the shared resources are shared and managed and make the sharing of resources transparent to the SE 102 and host device 120.

The lock module 1006 can be software including routines for enabling the SE 102 to act as a wireless, portable data store. In some embodiments, the lock module 1006 can be a set of instructions executable by the processor (not shown) of the host device 120 to provide the functionality described below for wireless, portable data storage. In some embodiments, the lock module 1006 can be stored in the memory (not shown) of the host device 120 and can be accessible and executable by the processor (not shown). In some implementations, the lock module 1006 can be adapted for cooperation and communication with the processor (not shown) and other components of the host device S and with the SE 102.

The lock module 1006 enables an SE 102 associated with the host device 120 to perform some of the functionality described above with reference to the digital pocket engine 204. For example, the lock module 1006 cooperates with the access control module 906 of the SE 102 so that the SE 102 acts as a digital key needed for a user to interact with and access the host device 120, When the SE 102 is in proximity, the host device 120 works. When the SE 102 is not in proximity, the host device 120 does not work. Therefore, if the host device (e.g. a cell phone) is lost or stolen, the data thereon is protected and the host device 120 is useless to anyone who finds it. In some embodiments, sensitive data or other user data is stored on the SE 102, so there is no data lost in the preceding scenario. The user may replace the lost or stolen host device 120 associate it with his/her SE 102 and be back to the status quo before the loss or theft.

It should be recognized that many of the features and functions described herein require an SE 102 and host device 120 to cooperate and communicate. For example, the remote wireless storage device capability and proximity based access to the host device 120 are two functions that require the SE 102 and the host device 120 to cooperate. The preceding description attributes certain functionality to module(s) on a specific device. For example, proximity determination is discussed with reference to one or more modules of the SE 102. However, it should be recognized that some functionality may be divided differently among the SE 102 and host device 120. For example, in one embodiment, the lock module 1006 may determine proximity in addition to or instead of the access control module 906.

FIGS. 11A-C are illustrations of a secure element 102 according to one embodiment. Referring to FIG. 11A-C, the illustrated SE 102 embodiment includes a male USB port 1102, which may be extended (as seen in FIG. 11A) or retracted (and is not visible in FIGS. 11B and 11C) when a user slides the USB actuator pad 1104 in a groove 1106 from a first position (as seen in FIG. 11A) to a second position (as seen in FIGS. 11B and 11C). The USB port 1102 may be used to charge a rechargeable battery (e.g. Li ion) of the SE 102, update the SE's 102 software including firmware, and utilize the SE 102 without a wireless connection (e.g. as a traditional thumb drive, a general security element with a biometric reader for the host device 120, etc.).

The illustrated SE 102 embodiment also includes indicator lights 1108 and 1110. For example, an indicator light 1108 (e.g. a blue LED) to indicate whether the SE 102 is charging or fully charged (e.g. when plugged into a USB charging cable or USB port on a host device 120) and one or more indicator lights 1110 to indicate whether an authentication or portion thereof was successful (e.g. a green LED to indicate a successful biometric reading and a red LED light to indicate a biometric read failed). The illustrated SE 102 embodiment also includes a fingerprint reader 1114 and a groove 1112 in the housing of the SE 102 to guide a user's finger across the fingerprint reader 1114. Referring now to FIGS. 11B-11C, an example of a USB cover/keychain connector 1116 is shown, which may be connected to the end of the SE 102 with the USB port in order to cover the USB port and provide an anchoring loop to attach the SE 102 to a lanyard, keychain or other item.

Figure 12A:
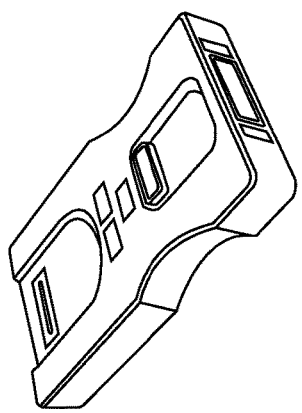
FIGS. 12A-F are illustrations of a secure element according to one embodiment.
Figure 12B:
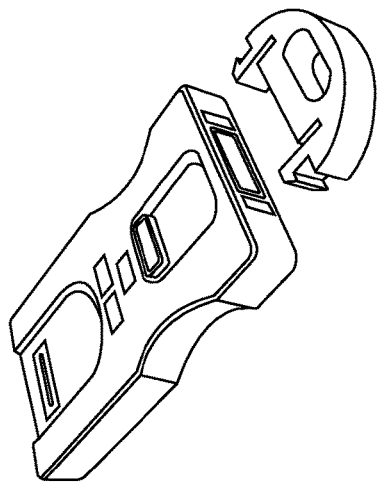
Figure 12C:
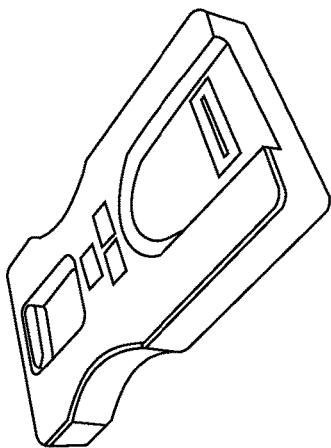
Figure 12D:
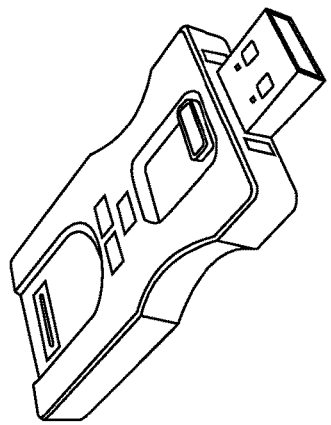
Figure 12E:
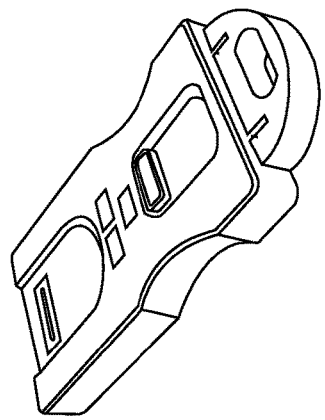
Figure 12F:
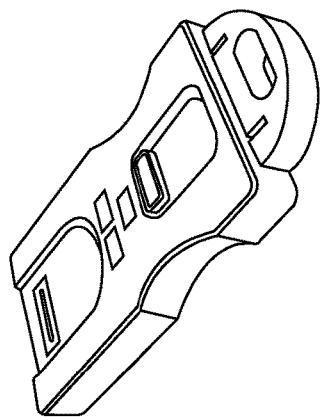

FIGS. 12A-F are illustrations of a secure element 102 according to one embodiment. FIGS. 12A-F show a SE 102 similar to that illustrated in FIGS. 11A-C, but offer a different perspective view. For example, FIG. 12D is similar to FIG. 11A, FIG. 12B is similar to FIG. 11B and FIGS. 12E and 12F are similar to FIG. 11C.

Figure 13:
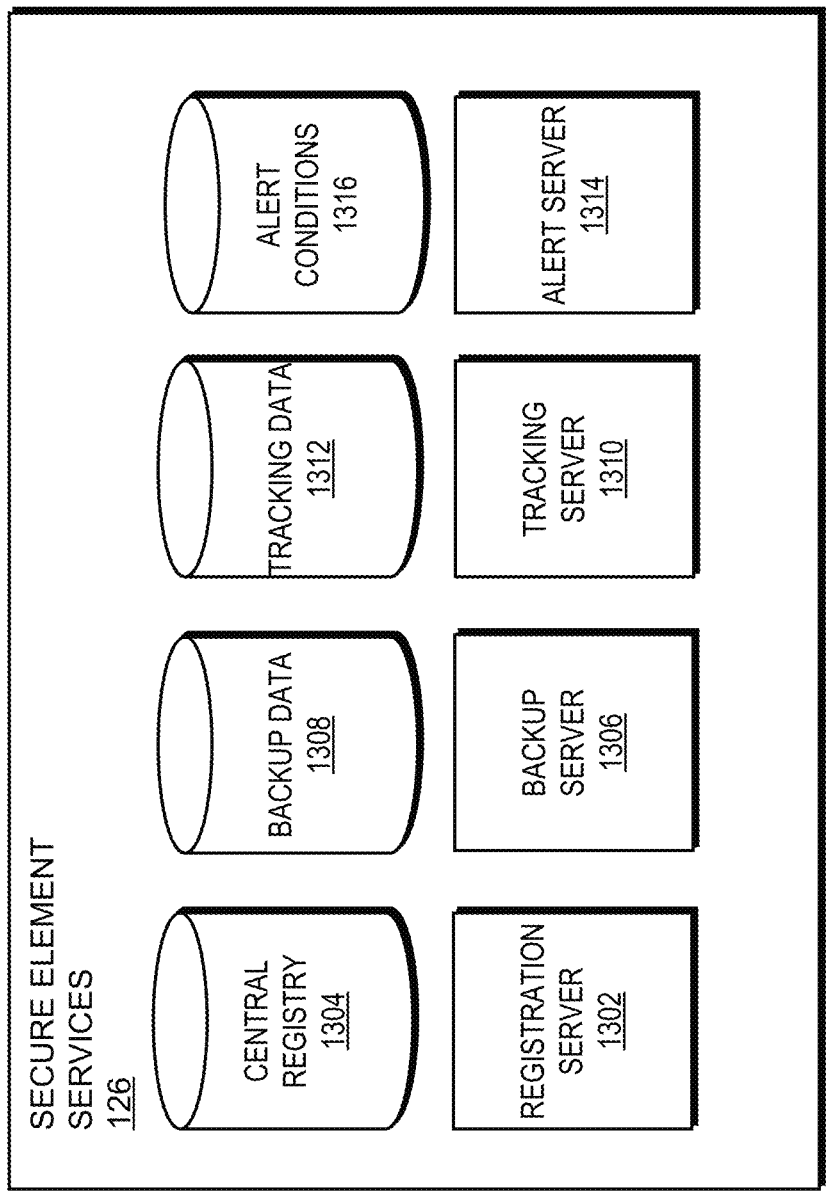
FIG. 13 is a block diagram illustrating an example of secure element services according to one embodiment.

FIG. 13 is a block diagram illustrating an example of secure element services 126 according to one embodiment. In one embodiment, the secure element services 126 provides various services related to or expanding on the functionality of the SE 102 described above. In the illustrated embodiment, the secure element services includes a registration server 1302 and central registry 1304, a backup server 1306 and backup data 1308, a tracking server 1310 and tracking data 1312, and an alert server 1314 and alert conditions. See Appendix A and B.

The registration server 1302 allows an owner of a SE 102 to register his/her SE 102. Registration may provide a number of benefits. For example, registration using a trusted third-party authority may ensure that the owner of the SE 102 and the provider of any biometric information stored to the SE 102 is who he/she purports to be. For example, in some embodiments, a notary agent may be required to witness a user's setup of an SE 102 and register the SE 102. For example, a user may be required to present government issued identification to a notary agent. The notary agent may then confirm the user's identity is consistent with the identification presented and witness the user's setup and storage of his/her biometric information onto the SE 102. In one such embodiment, when the user's biometric information is stored to the SE 102 during setup, it is unable to be subsequently altered (e.g. data based on the user's fingerprint is stored on a write once memory and is unable to be modified or overwritten). In one embodiment, a registry maintains information about the status of registered SEs 102 and may be used during authentication to enhance security. For example, the registry may indicate whether a particular SE 102 is in good standing, has been reported stolen, etc., and the registry is used during authentication to determine whether a SE 102 is in good standing. Depending on the embodiment, the registration may be to a private registry (not shown), i.e., a registry established and maintained by a private entity such as an employer, individual retailer, healthcare facility, etc. and used by that entity, or a central registry 1304, i.e., a highly-secured, centrally-located database administered by a trusted third-party organization.

The data stored by the registry may vary depending on the embodiment. In some embodiments, a registry includes a record in a database indicating that the SE 102 has been setup and registered. In some embodiment, a central register minimally includes a record for each registered SE 102, and the record indicates that the SE 102 was setup and registered by a third-party trusted authority (e.g. in the presence of/witnessed by a notary agent). Certain transactions may utilize a central registry to authenticate an SE 102 using the central registry, i.e., determine whether a SE 102 taking part in the transaction has been setup and registered by a third-party trusted authority and may choose to deny a transaction if the SE 102 has not been setup and registered with the central registry.

In one embodiment, the registry does not store any user identifying or user associated data. For example, in one embodiment, the registry stores the record including an identifier of the SE 102 and a status of the SE 102, but does not store a name or any other data associated with the owner of the SE 102. In one embodiment, a registry may store information in addition to the record. In one embodiment, the registry may store user identifying data or user associated data. For example, in one embodiment, a registry may store biometric information of the SE's owner. In one embodiment, when a registry stores biometric information of the SE's owner such as a fingerprint, the fingerprint is encrypted using an encryption key held by the SE 102. Such an embodiment may ensure that even if security of the central registry was compromised a user's biometric information could not be recreated. In one embodiment, the user's biometric information is created using a one-way hash so that the users biometric (e.g. fingerprint) cannot be recreated from biometric information even if unencrypted.

The backup server 1306 allows a SE 102's owner to backup his/her SE 102's data to the cloud where it is stored as user backup data 1308. Should a user choose to backup his/her SE 102, the backup server 1306 allows a user to select to backup the SE 102's data to the cloud, which may be beneficial should the SE 102 ever need to be replaced because of loss, damage, etc. In some embodiments, the backup server 1306 may perform a period backup automatically.

The tracking server 1310 allows an authorized user to track the movement of a SE 102 and determine the location of an SE 102. For example, a user's employer may be authorized (e.g. by the user) to track the movement of the user's SE 102 during work hours in order to perform motion studies in the employer's facilities. In another example, the owner of the SE 102 may use the tracking server 1310 to perform a location query to locate his/her misplaced SE 102.

The alert server 1314 allows users to define and store one or more alert conditions 1316 associated with a SE 102. For example, an alert condition defined to send an SMS text message to an Alzheimer's patient's primary caretaker when the SE 102 of that patient enters or leaves a specified location or has not moved for a specified period of time.

Figure 14:
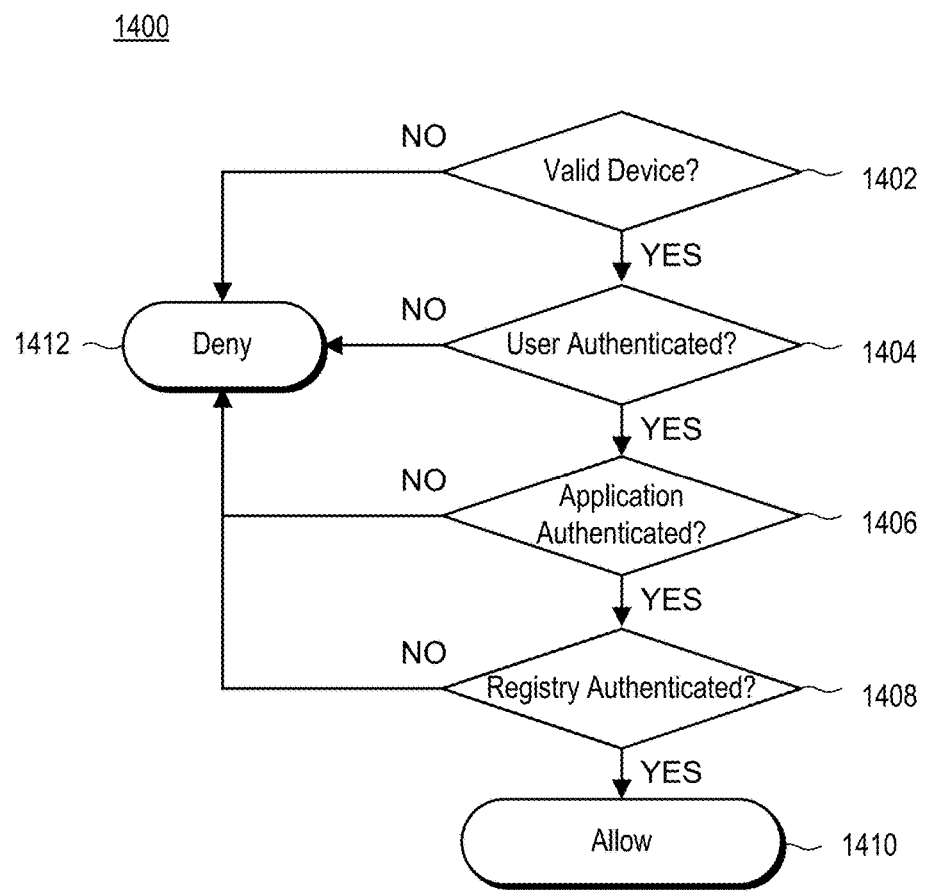
FIG. 14 is a flowchart of a method for authentication using a secure element according to one embodiment.

FIG. 14 is a flowchart of a method 1400 for authentication using a secure element according to one embodiment. In the illustrated embodiment, the authentication is performed to determine whether to allow or deny an action in the system 100. In the illustrated embodiment, the method 1400 begins at block 1402. At block 1402, the identification module 904 of a first SE 102 performs authentication to determine whether another SE 102 (e.g. a GSE at a point of sale) or host device 120 is valid. When the identification module 904 of the first SE 102 determines that the another SE 102 is valid (1402—Yes), the identification module 904 authenticates, at block 1404, the user of the first SE 102 (e.g. performs biometric authentication of the user). When the identification module 904 of the first SE 102 determines that the user is the owner or authorized user of the first SE 102 (1404—Yes), an application on the host device 120 authenticates the first SE 102 and/or the identification module 904 of the first SE authenticates an application requesting the action at block 1406. When the identification module 904 of the first SE 102 successfully authenticates the application and/or the application authenticates the first SE 102 (1406—Yes), a registry authenticates the first SE 102 at block 1410. When the registry successfully authenticates the first SE 102 (1408—Yes), a registry authenticates the first SE 102 at block 1408. The first SE 102 is in good standing (e.g. not lost, stolen, black listed, etc.) and the requested action is allowed at block 1410. Should there be a failure of device authentication (1402—No), user authentication (1404—No), application authentication (1406—No) or registry authentication (1408—No), the action is denied at block 1412 according to the embodiment.

Figure 15:
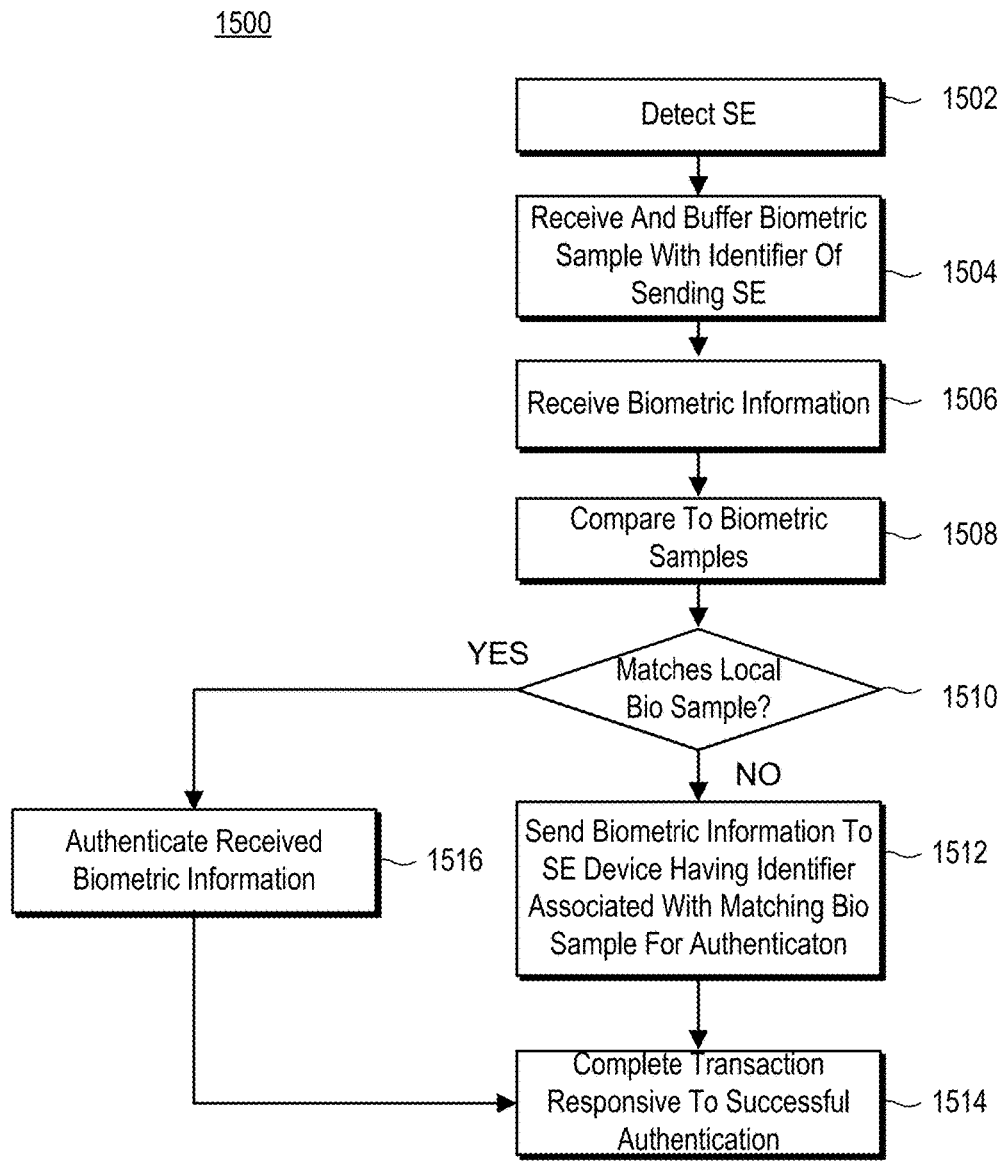
FIG. 15 is a flowchart of a method for a biometrically triggered transaction according to one embodiment.

FIG. 15 is a flowchart of a method 1500 for a biometrically triggered transaction according to one embodiment. The method begins at block 1502. At block 1502, an SE 102 detects another SE 102 in range. At block 1504, the SE 102 receives and buffers a biometric sample with an identifier of the other SE 102 that sent the biometric sample. At block 1506, the SE 102 receives biometric information. At block 1508, identification module 904 compares the biometric information to the biometric samples buffered on the SE 102. When biometric information matches (1510—Yes) the local biometric sample (i.e. the biometric sample of the SE 102 that received and buffered the biometric samples at block 1504), at block 1516, the identification module 904 of that SE 102 authenticates the biometric information received at block 1506 against the biometric information of the SE's 102 owner and, at block 1514, the wallet module 908 completes a transaction responsive to successful authentication at block 1516. When biometric information does not match (1510-No) the local biometric sample, at block 1512, the biometric information received at block 1506 is sent to an SE 102 device having the identifier associated with the matching biometric sample for authentication by that SE's 102 identification module 904, and responsive to successful authentication by that SE's 102 identification module 904, the wallet module 908 of the authenticating SE 102 completes a transaction at block 1514.

Figure 16:
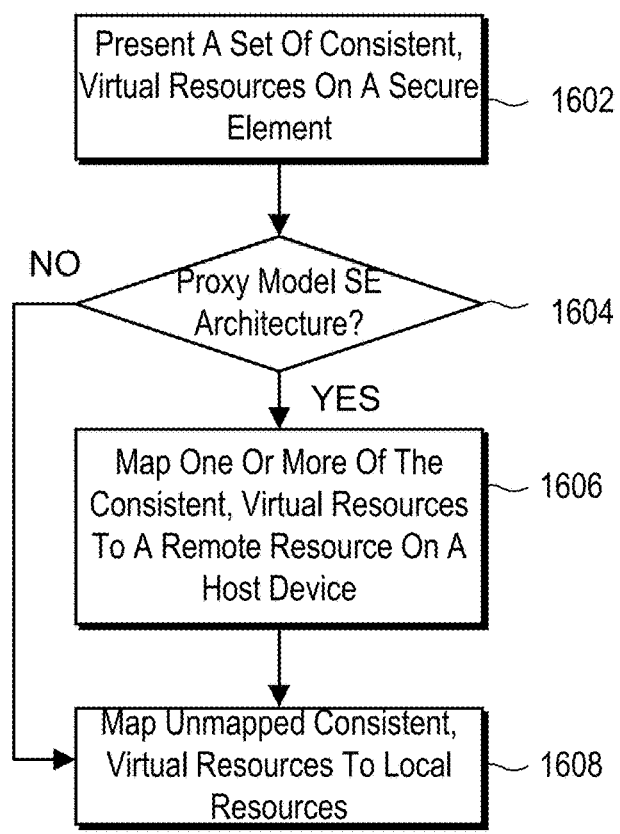
FIG. 16 is a flowchart of a method for hardware abstraction based on a secure element architecture according to one embodiment.

FIG. 16 is a flowchart of a method 1600 for hardware abstraction based on a secure element architecture according to one embodiment. The method 1600 begins at step 1602. At step 1602, a set of virtual resources are consistently presented on a SE 102. At block 1604, the SE 102 determines a secure element (SE) architecture. If the SE 102 determines that the SE architecture is not a proxy model architecture (1604—No), the method 1600 continues at block 1608. If the SE 102 determines that the SE architecture is a proxy model architecture (1604—Yes), the method 1600 continues at block 1606.

At block 1606, the abstraction layer 220 of the SE 102 maps one or more of the set of consistent, virtual resources to a remote resource on a host device 120 before continuing to block 1608. At block 1608, the abstraction layer 220 of the SE 102 maps unmapped consistent, virtual resources to local resources on the SE 102.

Figure 17:
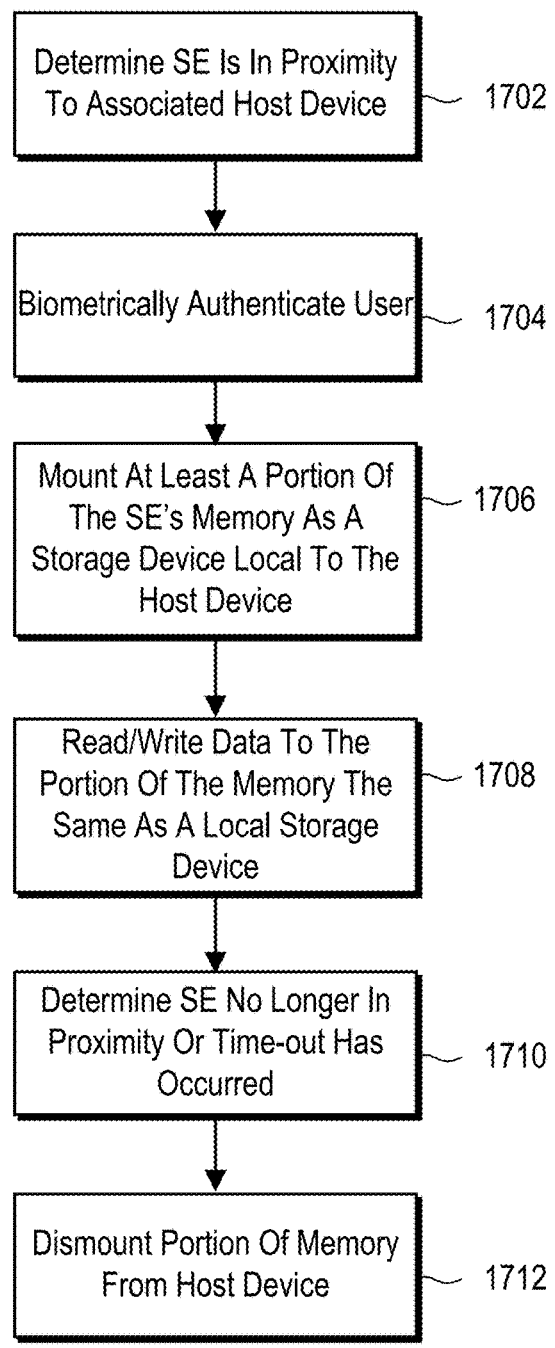
FIG. 17 is a flowchart of a method for a secure element acting as a wireless storage device according to one embodiment.

FIG. 17 is a flowchart of a method 1700 for a secure element acting as a wireless storage device according to one embodiment. The method 1700 begins at block 1702. At block 1702, one or more of an SE 102 and an associated host device 120 determines that the two devices 102, 120 are proximate. At block 1704, the SE 102 biometrically authenticates the user. At block 1706, the host device 120 mounts at least a portion of SE 102's memory as a local storage device. At block 1708, the host device 120 reads data from and/or writes data to the mounted portion of the SE's 102 memory as it would do with a local storage device attached to or included in the host device 120. At block 1710, a determination is made that the SE 102 and host device 120 are no longer proximate or a time-out has occurred (e.g. requiring the user to re-authenticate after a specified duration of time has elapsed in order to keep the portion of memory mounted). At block 1712, the host device 120 dismounts the portion of the SE's 102 memory.

In the above description, for purposes of explanation, numerous specific details are set forth in order to provide a thorough understanding of the specification. It will be apparent, however, to one skilled in the art that the specification may be practiced without these specific details. In other instances, structures and devices are shown in block diagram form in order to avoid obscuring the description. For example, one embodiment is described above with reference to particular hardware. However, the specification applies to any type of portable computing device that can receive data and commands.

Reference in the specification to "one embodiment" or "an embodiment" means that a particular feature, structure, or characteristic described in connection with the embodiment is included in at least one embodiment of the specification. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the specification can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to a particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the specification can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the specification is in no way limited to implementation in any specific programming language, or for any specific operating system or environment. Accordingly, the disclosure is intended to be illustrative, but not limiting, of the scope of the specification, which is set forth in the following claims.

What is claimed is:

1. A system comprising:
a secure element configured to wirelessly communicate with an associated host device, the secure element including a set of consistent virtual resources used to map a set of available resources based on a model architecture, the set of available resources variable based on one or more of the model architecture and resources associated with a host device, the set of consistent virtual resources allowing consistent interaction with the set of consistent virtual resources independent of variation in the set of available resources and independent of whether a resource within the set of available resources is located at the secure element, at the host device, or both; and the associated host device including a link module executable by a processor, the link module of the associated host device cooperating with the secure element to make a first resource available to the secure element.

2. The system of claim 1, the system comprising:
a biometric sensor configured to obtain physical or behavioral characteristics from a user; and
an identification module executable by the processor of the secure element to authenticate the user as an owner of the secure element based on obtained physical or behavioral characteristic.

3. The system of claim 2, wherein the biometric sensor is the first resource and is thus included in the associated host device, but available to the secure element as a virtual biometric sensor via an abstraction layer.

4. A method comprising:
presenting, to a secure element, a set of consistent virtual resources; and
mapping the set of consistent virtual resources to a set of available resources based on a model architecture, the set of available resources variable based on one or more of the model architecture and resources associated with a host device, the set of consistent virtual resources allowing consistent interaction with the set of consistent virtual resources independent of variation in the set of available resources and independent of whether a resource within the available resources is located at the secure element, at the host device, or both.

5. The method of claim 4, wherein the available resources are physical resources and hardware abstraction is provided.

6. The method of claim 4, wherein the model architecture is a proxy model architecture, the method comprising:
mapping a first virtual resource to a first resource on the host device, and
wherein the mapping allows the secure element to interact with the first virtual resource as if the first virtual resource is a local resource of the secure element, wherein the secure element and the host device are physically separate devices.

7. The method of claim 4, wherein the model architecture is a proxy model architecture, the method comprising:
performing, at the secure element, a functionality of the secure element, the host device wirelessly controlling the performance of the functionality, the secure element performing the functionality on behalf of the host device, wherein the host device is physically separate from the secure element.

8. The method of claim 7, wherein the functionality of the secure element performed is one or more of an authentication and an execution of a financial transaction.

9. The method of claim 4, further comprising:
determining whether the security element is in proximity to the host device; and
responsive to determining the secure element is in proximity to the host device, permitting access to the host device.

10. The method of claim 9, wherein the access to the host device is permitted subsequent to a biometric authentication of a user.

11. The method of claim 10, wherein the biometric authentication of the user utilizes a biometric sensor included in the available resources to capture biometric data of the user and compares the captured biometric data to biometric data of an authorized user stored at the secure element, the biometric sensor located at the host device.

12. The method of claim 10, wherein the biometric authentication of the user utilizes a biometric sensor included in the available resources to capture biometric data of the user and compares the captured biometric data to biometric data of an authorized user stored at the secure element, the biometric sensor located at the secure element.

13. The method of claim 9, wherein the secure element may associated with one or more additional host devices and permit access to the one or more additional host devices when in proximity to the one or more additional host devices.

14. The method of claim 13, wherein the host device and the one or more additional host devices are different types of devices.

15. The method of claim 4, further comprising:
determining whether the security element is in proximity to the host device; and
responsive to determining the secure element is in proximity to the host device, wirelessly mounting at least a portion of a memory of the secure element on the host device, the mounted portion of the memory appearing as a physically connected storage device at the host device.

16. The method of claim 15, wherein the wireless mounting is based on one or more of a user configurable proximity and a user configurable duration of time for the secure element to be in proximity to the host device.

17. The method of claim 4, wherein the model architecture is a stand-alone model architecture, and the set of consistent virtual resources is mapped to resources available on the secure element.

18. The method of claim 4, wherein the model architecture is a virtual model architecture, and at least a portion of the set of consistent virtual resources is mapped to one or more resources available on the host device, wherein the secure element is a virtual secure element operating on the host device, but appearing to other devices as a separate device.

19. The method of claim 4, wherein the secure element is platform agnostic and operates independent of a platform the host device is operating.

20. The method of claim 4, wherein the secure element is a device that performs functionality of one or more of a physical key, a logical key, a proximity based lock controlling access to a physical resource or logical resource, and user authentication.

* * * * *